(12) United States Patent
Matsuzawa et al.

(10) Patent No.: US 11,940,769 B2
(45) Date of Patent: Mar. 26, 2024

(54) MACHINE TOOL, METHOD FOR EDITING MACHINING PROGRAM FOR MACHINE TOOL, AND NON-TRANSITORY COMPUTER-READABLE STORAGE MEDIUM

(71) Applicant: Yamazaki Mazak Corporation, Niwa-gun (JP)

(72) Inventors: Hiroaki Matsuzawa, Niwa-gun (JP); Yuuki Yamamoto, Niwa-gun (JP); Takuro Katayama, Niwa-gun (JP); Morikuni Kimura, Niwa-gun (JP)

(73) Assignee: YAMAZAKI MAZAK CORPORATION, Aichi (JP)

( * ) Notice: Subject to any disclaimer, the term of this patent is extended or adjusted under 35 U.S.C. 154(b) by 159 days.

(21) Appl. No.: 17/477,537

(22) Filed: Sep. 17, 2021

(65) Prior Publication Data
US 2022/0004158 A1      Jan. 6, 2022

Related U.S. Application Data

(63) Continuation of application No. PCT/JP2019/028560, filed on Jul. 19, 2019.

(51) Int. Cl.
*G05B 19/042*      (2006.01)

(52) U.S. Cl.
CPC ............... *G05B 19/0426* (2013.01); *G05B 2219/13046* (2013.01)

(58) Field of Classification Search
CPC ...... G05B 19/0426; G05B 2219/13046; G05B 2219/36088; G05B 19/409; G05B 19/4093; Y02P 90/02
See application file for complete search history.

(56) References Cited

U.S. PATENT DOCUMENTS 10,926,367 B2 *   2/2021   Kasahara ........... B23Q 17/0909
2013/0257738 A1   10/2013  Tanaka
(Continued)

FOREIGN PATENT DOCUMENTS

CN    101436050    5/2009
CN    101488018    7/2009
(Continued)

OTHER PUBLICATIONS

Chinese Office Action for corresponding CN Application No. 201980093408.9, dated May 30, 2022.
(Continued)

*Primary Examiner* — Mohammad Ali
*Assistant Examiner* — Sheela Rao
(74) *Attorney, Agent, or Firm* — MORI & WARD, LLP

(57) ABSTRACT

A method for editing a machining program includes obtaining tool information specifying a tool mountable on a machine tool. A program editing window and at least one assistance window are displayed. The program editing window shows a program code of the machining program to control the machine tool. Each of the assistance window selectively shows the tool information and a control method. The tool is to be controlled according to the control method. In the program code, an insertion position at which a new code is to be inserted into the program code is specified. Selected information is selected from the tool information when the tool information is shown in the at least one assistance window. A command corresponding to the selected information is inserted into the program code at the insertion position.

21 Claims, 21 Drawing Sheets

(56) References Cited

U.S. PATENT DOCUMENTS

| | | | |
|---|---|---|---|
| 2017/0168698 A1 | 6/2017 | Sakamoto et al. | |
| 2017/0300035 A1* | 10/2017 | Kawai | G05B 19/409 |
| 2017/0308063 A1* | 10/2017 | Kawai | B23Q 17/0914 |
| 2017/0315535 A1* | 11/2017 | Ishii | G05B 19/402 |
| 2018/0085878 A1 | 3/2018 | Agudelo | |
| 2022/0155750 A1* | 5/2022 | Matsui | G05B 19/4069 |

FOREIGN PATENT DOCUMENTS

| | | |
|---|---|---|
| CN | 103238124 | 8/2013 |
| CN | 107077118 | 8/2017 |
| CN | 107077125 | 8/2017 |
| CN | 107870605 | 4/2018 |
| EP | 3203333 | 8/2017 |
| EP | 3203336 | 8/2017 |
| JP | 2-259808 | 10/1990 |
| JP | 2010-003187 | 1/2010 |
| JP | 2010-003287 | 1/2010 |
| JP | 2017-111516 | 6/2017 |
| JP | 2018-045727 | 3/2018 |
| JP | 2018-101401 | 6/2018 |
| WO | WO 2016/051543 | 4/2016 |
| WO | WO 2016/051544 | 4/2016 |
| WO | WO 2018/096676 | 5/2018 |

OTHER PUBLICATIONS

European Office Action for corresponding EP Application No. 19938681.4-1216, dated May 31, 2022.
European Search Report for corresponding EP Application No. 19938681.4-1216, dated Nov. 12, 2021.
European Office Action for corresponding EP Application No. 19938681.4-1216, dated Nov. 24, 2021.
Chinese Office Action for corresponding CN Application No. 201980093408.9, dated Jan. 4, 2022.
The International Preliminary Report on Patentability (Chapter I) with translation of Written Opinion for corresponding International Application No. PCT/JP2019/028560, dated Feb. 3, 2022.
International Search Report for corresponding International Application No. PCT/JP2019/028560 dated Sep. 24, 2019.
Written Opinion for corresponding International Application No. PCT/JP2019/028560 dated Sep. 24, 2019.

* cited by examiner

MACHINE TOOL, METHOD FOR EDITING MACHINING PROGRAM FOR MACHINE TOOL, AND NON-TRANSITORY COMPUTER-READABLE STORAGE MEDIUM

CROSS-REFERENCE TO RELATED APPLICATIONS

The present application is a continuation application of International Application No. PCT/JP2019/028560, filed Jul. 19, 2019. The contents of this application are incorporated herein by reference in their entirety.

BACKGROUND OF THE INVENTION

Field of the Invention

The present invention relates to a machine tool, a method for editing a machining program for a machine tool, and a non-transitory computer-readable storage medium.

Discussion of the Background

JP 2017-111516A discloses a machining program editor that displays a program and an assistance window in such a manner that the assistance window is adjacent to the program so that data on the assistance window can be reflected in the program by a touch manipulation. JP 2010-003287A discloses an NC (Numerically Controlled) program input device that displays, on an assistance window, a GUI (graphic user interface) window showing codes that can be input into a program so that a code selected on the GUI window can be inserted in the program code.

SUMMARY OF THE INVENTION

According to one aspect of the present disclosure, a method for editing a machining program includes obtaining tool information specifying a tool mountable on a machine tool. A program editing window and at least one assistance window are displayed. The program editing window shows a program code of the machining program to control the machine tool. Each of the assistance window selectively shows the tool information and a control method. The tool is to be controlled according to the control method. In the program code, an insertion position at which a new code is to be inserted into the program code is specified. Selected information is selected from the tool information when the tool information is shown in the at least one assistance window. A command corresponding to the selected information is inserted into the program code at the insertion position.

According to another aspect of the present disclosure, a machine tool includes a memory, at least one display, an interface, and circuitry. The memory is to store tool information specifying a tool mountable on a machine tool. The at least one display is configured to display a program editing window and at least one assistance window. The program editing window shows a program code of the machining program to control the machine tool. Each of the at least one assistance window selectively shows the tool information and a control method. The tool is to be controlled according to the control method. An insertion position at which a new code is to be inserted into the program code is input via the interface. The circuitry is configured to insert a command into the program code at the insertion position, the command corresponding to selected information that is selected from the tool information when the tool information is shown in the at least one assistance window.

According to further aspect of the present disclosure, a non-transitory computer-readable storage medium stores a machining program. The machining program causes a computer to execute processing includes obtaining tool information specifying a tool mountable on a machine tool. A program editing window and at least one assistance window are displayed. The program editing window shows a program code of the machining program to control the machine tool. Each of the assistance window selectively shows the tool information and a control method. The tool is to be controlled according to the control method. In the program code, an insertion position at which a new code is to be inserted into the program code is specified. Selected information is selected from the tool information when the tool information is shown in the at least one assistance window. A command corresponding to the selected information is inserted into the program code at the insertion position.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
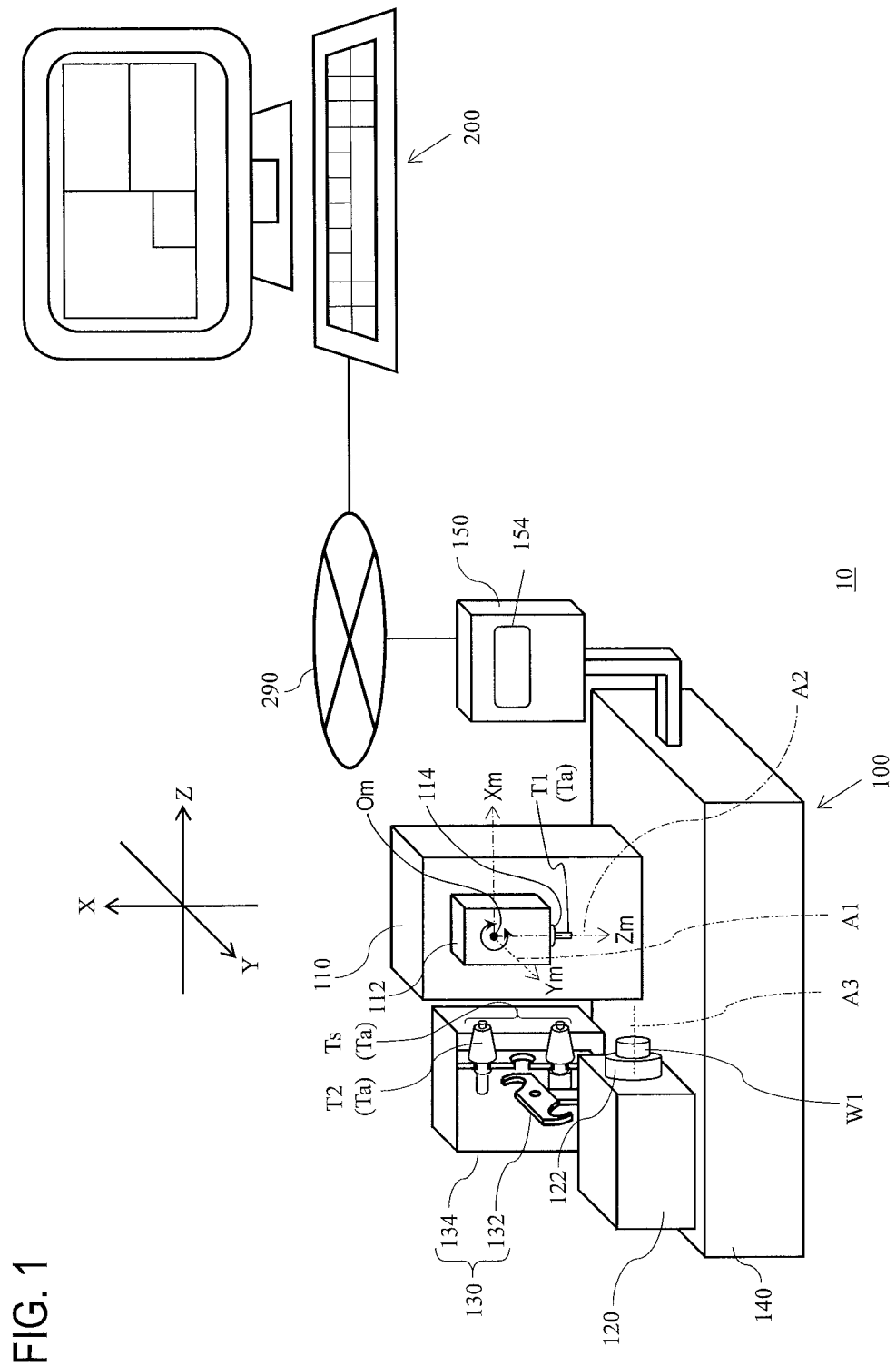
FIG. 1 illustrates a schematic configuration of a system that includes: a machine tool according to an embodiment; and a computer that edits a machining program for the machine tool.

The present invention will now be described with reference to the accompanying drawings, wherein like reference numerals designate corresponding or identical elements throughout the various drawings.

FIG. 1 illustrates a schematic configuration of a system 10 according to this embodiment of the present invention. The system 10 includes: a machine tool 100; a computer 200, which edits a machining program for the machine tool; and a network 290, which connects the machine tool 100 and the computer 200 to each other. A non-limiting example of the network 290 is a LAN (local area network) provided in a factory, a plant, or another industrial facility. While the network 290 illustrated is a wired network, the network 290 may be a wireless network. It is to be noted that as illustrated in FIG. 1, the X axis is along the height direction of the machine tool 100, the Y axis is along the depth direction of the machine tool 100, and the Z axis is along the width direction of the machine tool 100. This embodiment is in accordance with a JIS standard in that the Z axis is an axis parallel to rotation axis A3 of a workpiece spindle 122, which holds a workpiece. In this embodiment, this coordinate system will be referred to as workpiece coordinate system.

The machine tool 100 performs machining on a workpiece W1. The machining includes at least one of turning and milling. The machining may further include drilling. As illustrated in FIG. 1, the machine tool 100 includes a column 110, a workpiece headstock 120, and a tool exchanger 130. The column 110, the workpiece headstock 120, and the tool exchanger 130 are provided on a base 140.

The column 110 is movable in the Y axis direction and the Z axis direction on the base 140. A tool headstock 112 is mounted on the column 110. The tool headstock 112 is movable in the X axis direction relative to the column 110. The tool headstock 112 is swingable, relative to the column 110, about a swinging axis A1, which is along the Y axis direction. A tool spindle 114 is mounted on the tool headstock 112. The tool spindle 114 is rotatable about a rotation axis A2 relative to the tool headstock 112. The rotation axis A2 is orthogonal to the swinging axis A1. The tool spindle 114 is holding a first tool T1, which is a machining tool. As used herein, the term "machining tool" is intended to mean a concept encompassing a turning tool and a milling tool. In this embodiment, a drill used in drilling will be regarded as one milling tool.

In this embodiment, the intersection between the axis A1 and the axis A2 will be referred to as the machine origin Om; the rotation axis A2 will be referred to as Zm axis; the swinging axis A1 will be referred to as Ym axis; an axis perpendicular to the Zm axis and the Ym axis will be referred to as Xm axis; and a coordinate system defined by these axes will be referred to as machine coordinate system. The direction extending from the machine origin Om toward the leading end of a first tool T1 will be regarded as positive direction of the Zm axis. The X axis of the workpiece coordinate system is rotated about the Y axis such that the positive direction of the X axis of the workpiece coordinate system is identical to the positive direction of the Xm axis of the machine coordinate system. This makes the positive direction of the Z axis of the workpiece coordinate system identical to the positive direction of the Zm axis of the machine coordinate system. The positive direction of the Y axis of the workpiece coordinate system will be regarded as the positive direction of the Ym axis of the machine coordinate system.

The workpiece headstock 120 includes the workpiece spindle 122. The workpiece spindle 122 is rotatable about rotation axis A3. The rotation axis A3 is along the Z axis direction. The workpiece W1 is attached to the workpiece spindle 122.

The tool exchanger 130 exchanges a machining tool attached to the tool spindle 114. Specifically, the tool exchanger 130 includes a magazine arm 132 and a stocker 134. The magazine arm 132 is swingable about an axis along the Z axis direction. The magazine arm 132 is movable in the X axis direction relative to the stocker 134. The stocker 134 stores a plurality of machining tools Ts such that the machining tools Ts are arranged side by side in the X axis direction. The plurality of machining tools Ts stored in the stocker 134 include a second tool T2, which is exchangeable with the first tool T1.

The machining tool is exchanged with another machining tool by the tool exchanger 130 according to the following procedure. With the rotation axis A2 extending along the Z axis direction, the column 110 approaches the tool exchanger 130 in the Z axis direction. The magazine arm 132 includes: a first gripper provided at one end of the magazine arm 132 in its extension direction; and a second gripper provided at the other end of the magazine arm 132 in the extension direction. In order to remove the first tool T1 attached to the tool spindle 114, the first gripper holds the first tool T1 attached to the tool spindle 114. More specifically, upon swinging of the magazine arm 132 by a predetermined swinging angle about the axis along the Z axis direction, the first gripper holds the first tool T1, and, simultaneously, the second gripper holds the second tool T2 stored in the stocker 134. Then, the column 110 moves away from the tool exchanger 130 in the Z axis direction, removing the first tool T1 from the tool spindle 114. In order to attach the second tool T2 to the tool spindle 114, the magazine arm 132 swings about the axis along the Z axis direction to move the second tool T2 held by the second gripper tool to a tool attachment position. The column 110 approaches the tool exchanger 130 in the Z axis direction, causing the second tool T2 to be attached to the tool spindle 114.

The machine tool 100 includes a controller 150. The controller 150 controls rotational motions about the rotation axes, swinging motions about the swinging axis, and movements in the axis directions. The controller 150 is connected to the base 140. It is to be noted that the controller 150 may be connected to another portion of the machine tool 100, or may be provided at a position apart from the base 140 insofar as the controller 150 is capable of transmitting control signals and/or receiving detection results.

Figure 2:
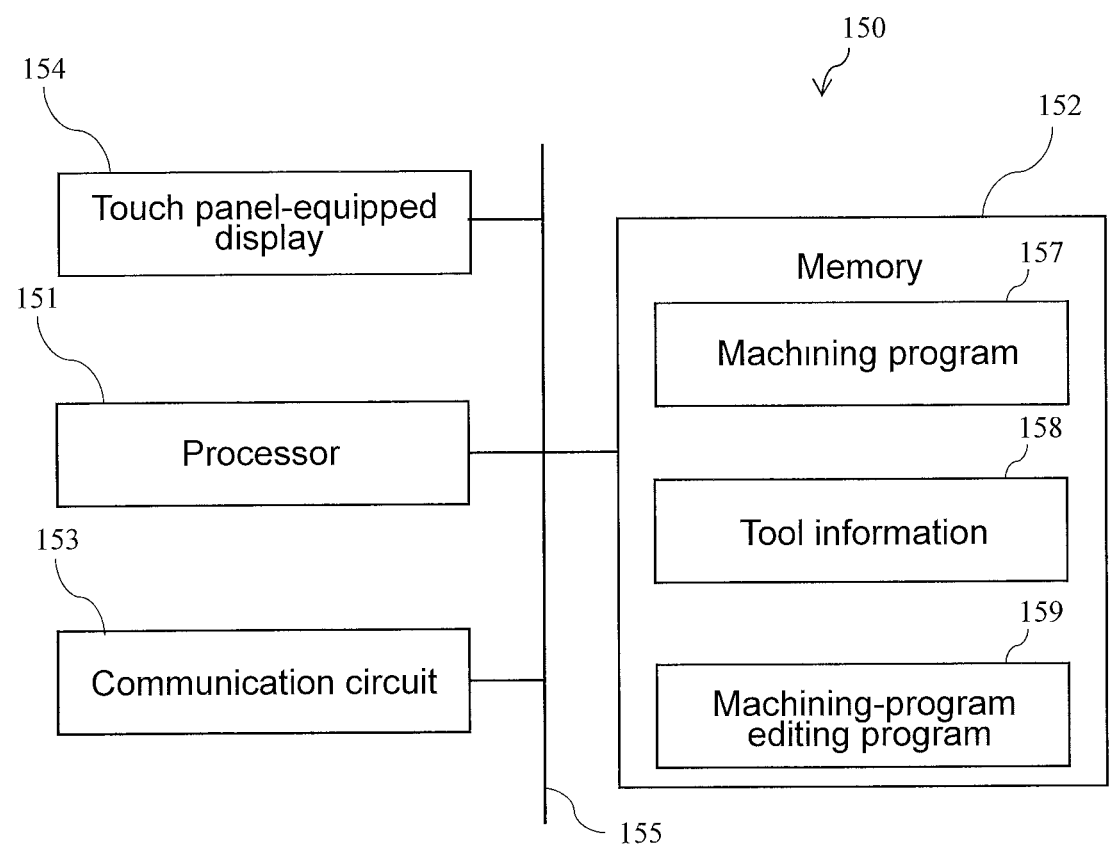
FIG. 2 is a hardware block diagram of a control apparatus.

FIG. 2 is a hardware block diagram of the controller 150. As illustrated in FIG. 2, the controller 150 includes a processor 151 (circuitry), a memory 152, a communication circuit 153, and a touch panel-equipped display 154. The processor 151, the memory 152, the communication circuit 153, and the touch panel-equipped display 154 are connected to each other via a bus 155. The memory 152 stores programs and data necessary for machining. The processor 151 reads a program stored in the memory 152 and executes the program that has been read. In this manner, the functions of the controller 150 are implemented. The functions implemented by the controller 150 include control of machining.

Specifically, the memory 152 stores a machining program 157. The machining program 157 includes a control command for performing turning. The machining program 157 is usually edited in the computer 200, transmitted to the controller 150 via the network 290, and stored in the memory 152. The communication circuit 153 has functions necessary for communicating with the computer 200 via the network 290; specifically, a function of converting a communication packet into data, a function of converting data into a communication packet, and a function of transmitting and receiving communication packets.

In this embodiment, the memory 152 stores tool information 158. The tool information 158 is about tools Ta mountable on the machine tool 100 (for example, the first tool T1, and the second tool T2 and all other machining tools that are among the plurality of machining tools Ts stored in the stocker 134 and that are mountable on the machine tool 100). The tool information 158 is transmitted by the communication circuit 153 to the computer 200 via the network 290. The tool information 158 is read from the memory 152 at the time when a machining-program editing program 159, described later, is executed. Details of the tool information 158 will be described later.

The memory 152 may store the machining-program editing program 159, which is for editing the machining program 157. The machining-program editing program 159 is usually executed when part of the machining program 157 is corrected. It is also possible to generate the machining program 157 from the beginning by executing the machining-program editing program 159.

The touch panel-equipped display 154 may be a single display 154 or may be a combination of a plurality of displays. It is to be noted that the "display" of the touch panel-equipped display 154 is a display example, and the "touch panel" of the touch panel-equipped display 154 is an interface example. It is also to be noted that the touch panel-equipped display 154 may be substituted with a combination of: a display without a touch panel; and input devices provided around the display, examples including buttons, switches, a lever, and a pointing device. In this case, the input devices are interface examples.

Figure 3:
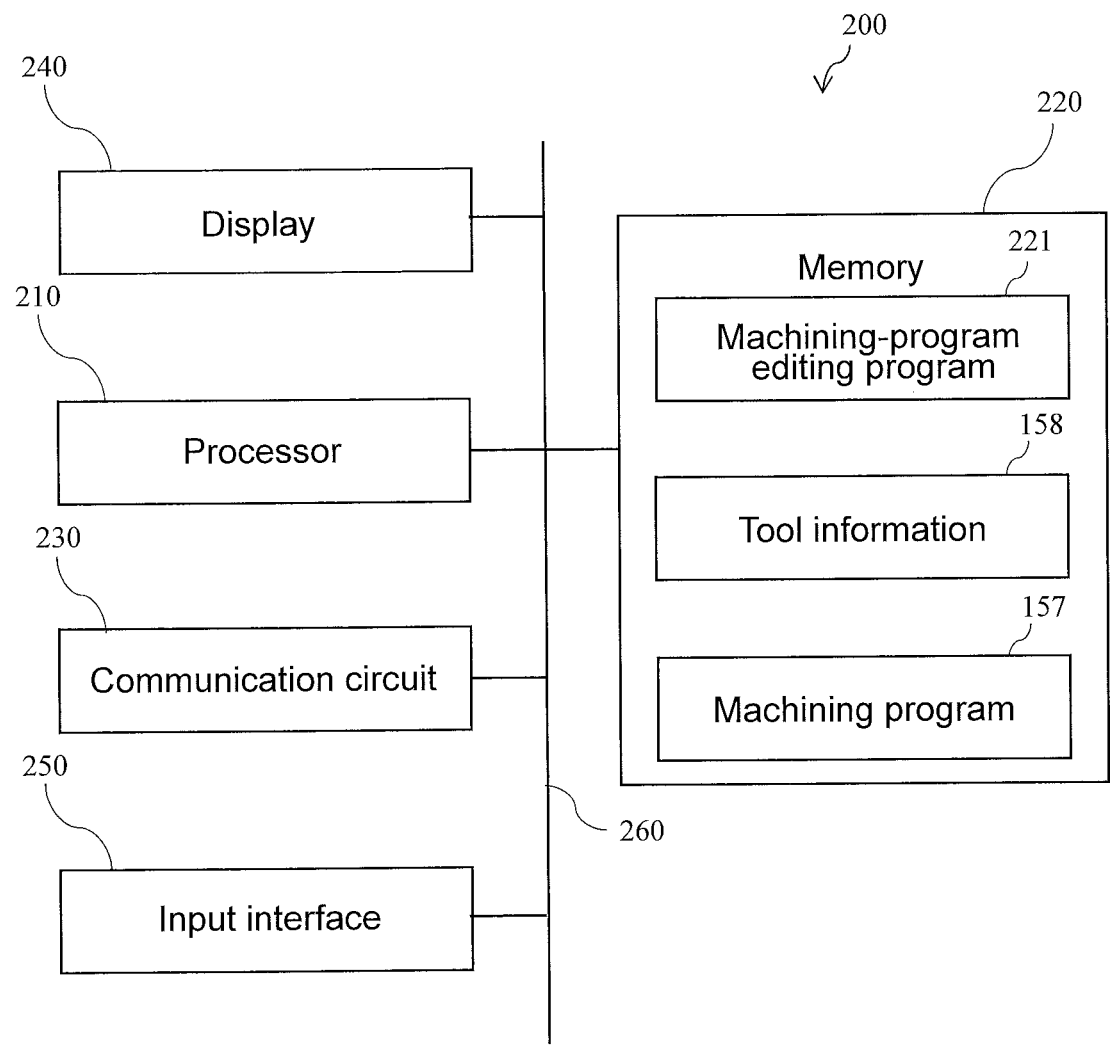
FIG. 3 is a hardware block diagram of the computer.

FIG. 3 is a hardware block diagram of the computer 200. As illustrated in FIG. 3, the computer 200 includes a processor 210, a memory 220, a communication circuit 230, a display 240, and an input interface 250. The processor 210, the memory 220, the communication circuit 230, the display 240, and the input interface 250 are connected to each other via a bus 260. The input interface 250 is an interface example. For example, the input interface 250 is a pointing device such as a keyboard and a mouse. It is to be noted that the computer 200 may be a combination in which the display 240 and the input interface 250 are integral to each other. Anon-limiting example of such combination is a tablet computer provided with a touch panel-equipped display. It is also to be noted that the display 240 may be a combination of a plurality of displays.

The memory 220 stores: a machining-program editing program 221, which is for editing the machining program 157; data necessary for executing the program; and a program such as an operating system. The machining-program editing program 221 has functions substantially identical to the functions of the machining-program editing program 159. It is to be noted, however, that the screen display method for displaying the machining-program editing program 221 may be partially different from the screen display method for displaying the machining-program editing program 159. The memory 220 may further store an edited version of the machining program 157 edited by the machining-program editing program 221. The processor 210 reads a program stored in the memory 220 and executes the program that has been read. The communication circuit 230 has functions necessary for communicating with the computer 200 via the network 290; specifically, a function of converting a communication packet into data, a function of converting data into a communication packet, and a function of transmitting and receiving communication packets.

The machining program 157 is generated using the machining-program editing program 221, and the computer 200 transmits the machining program 157 thus generated to the controller 150 using the communication circuit 230. Upon execution of the machining-program editing program 221, the computer 200 obtains the tool information 158 from the controller 150 using the communication circuit 230, and stores the tool information 158 in the memory 220.

Next, content of the machining program 157 will be described. In this embodiment, the machining program 157 is described in a program code for numerical control of the machine tool 100. Also, the program code is made up of character strings of alphabets and numerical values. For example, the following codes are prepared.

G code: A code that specifies a preparation function for preparation of working (an example of this code is a way in which the tool moves).

M code: A code that plays a supplementary role for the G code.

T number: A number that specifies a machining tool.

S number: A number that specifies a parameter of the machine tool such as spindle rotational frequency.

F number: A number that specifies a parameter such as feed rate of a turning tool.

X, Y, Z, U, V, W, A, B, C: Symbols that specify a coordinate axis.

N+ value: A sequence number that specifies a jump position in a program.

G code is standardized as ISO 6983. M code includes a customized code uniquely generate by a machine tool manufacturer. M code may further include a standardized code.

General Display Window

Figure 4:
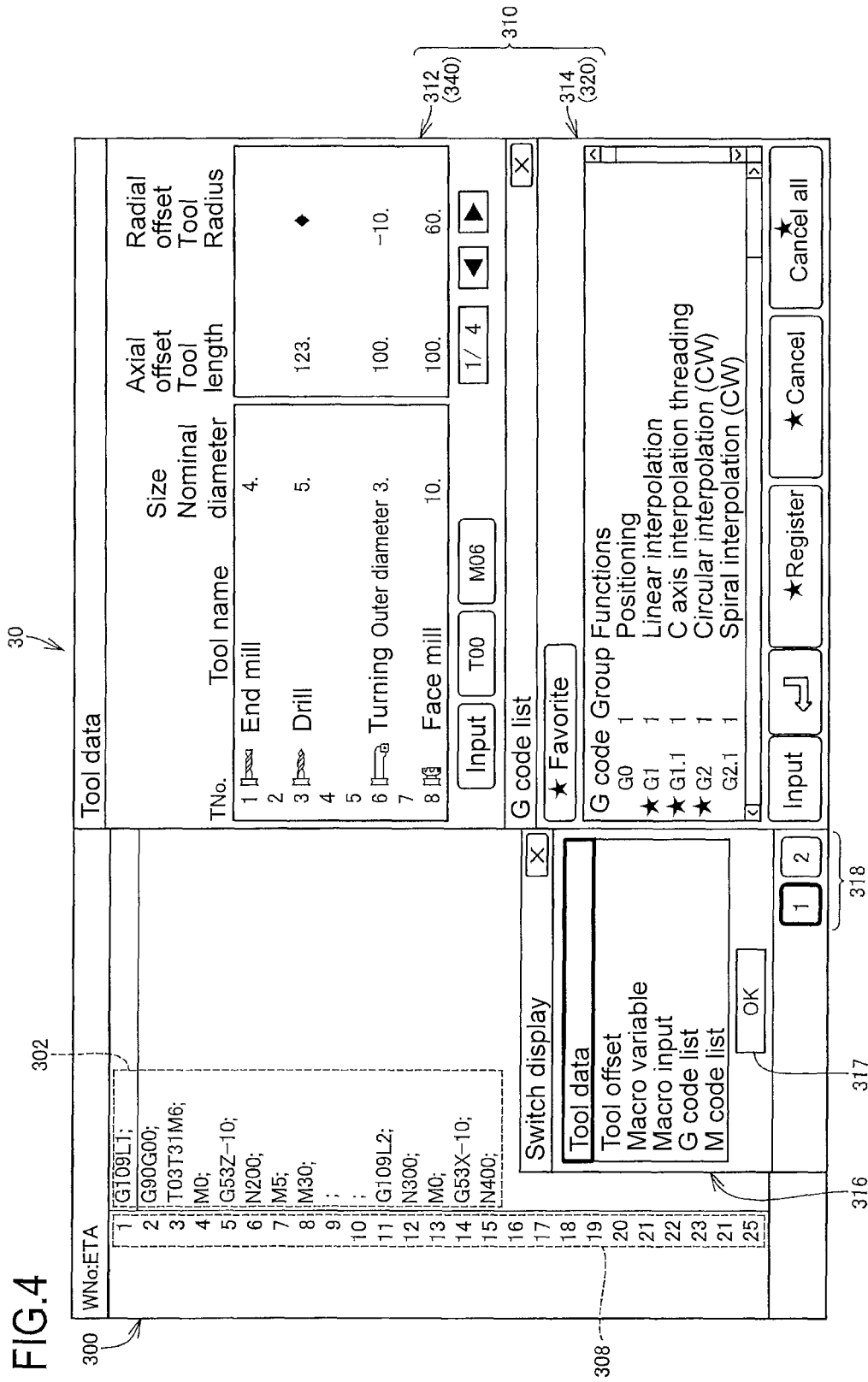
FIG. 4 illustrates an example of a display window showing a machining-program editing program according to the embodiment.

FIG. 4 illustrates an example of a display window 30 showing the machining-program editing program 221 according to the embodiment. The display window 30 is displayed in the display 240. It is to be noted that a display window showing the machining-program editing program 159 in the touch panel-equipped display 154 of the controller 150 is substantially identical to the display window 30, with an exception described later. The display window 30 includes a program editing window 300 and at least one assistance window 310. Preferably, the program editing window 300 and the at least one assistance window 310 is displayed in the one display 240/154.

In the program editing window 300, a program code 302 of the machining program 157 is displayed. The program code 302 is for controlling the machine tool 100. In FIG. 4, a row number 308 is illustrated in the program editing window 300 to show a position in the program code 302. The row number 308, however, may be omitted. In the program editing window 300, an insertion position at which to insert a G code can be specified by: tapping the touch panel of the touch panel-equipped display 154; clicking on the input interface 250 using a mouse; or moving a cursor over the input interface 250 using a keyboard. Thus, the touch panel of the touch panel-equipped display 154 and the pointing device of the input interface 250 serve as interfaces for specifying an insertion position at which a new code is to be inserted into the program code 302.

In the at least one assistance window 310, information for the programmer to refer to in editing the program code 302 is displayed. In FIG. 4, a first assistance window 312 and a second assistance window 314 are displayed as the at least one assistance window 310. The example illustrated in FIG. 4, however, is not intended in a limiting sense; the at least one assistance window 310 may be displayed in the form of one assistance window or equal to or more than three assistance windows. Referring to FIG. 4, the program editing window 300 and the at least one assistance window 310 are displayed such that the windows 300 and 310 are arranged side by side. In the example illustrated in FIG. 4, the program editing window 300 is displayed in a left side area of the display window 30, and the first assistance window 312 and the second assistance window 314 are displayed in a right side area of the display window 30. This arrangement, however, is not intended as limiting the manner in which the program editing window 300 and the at least one assistance window 310 are displayed; the program editing window 300 and the at least one assistance window 310 may be displayed in a left-right reversal arrangement. Another possible example is that the program editing window 300 and the at least one assistance window 310 are displayed in a vertical arrangement or a diagonal arrangement.

It is also to be noted that the at least one assistance window 310 (for example, the first assistance window 312 and the second assistance window 314) may not necessarily be displayed collectively in one side area of the program editing window 300. For example, the program editing window 300 and the at least one assistance window 310 may be displayed such that the program editing window 300 is provided between a part of the at least one assistance window 310 (for example, the first assistance window 312) and the rest of the at least one assistance window 310 (for example, the second assistance window 314).

It is also to be noted that the program editing window 300 and the at least one assistance window 310 may not necessarily be arranged side by side in one direction when the windows 300 and 301 are displayed. For example, the first assistance window 312 may be displayed at a position on the right side of the program editing window 300, and the second assistance window 314 may be displayed at a position under the program editing window 300. For further example, the at least one assistance window 310 may be displayed such that the window 310 surrounds the program editing window 300. That is, the windows of the at least one assistance window 310 may be displayed in any manner insofar as the windows are arranged side by side with the program editing window 300. It is to be noted that for convenience of the programmer, the windows of the at least one assistance window 310 are preferably displayed at positions near the program editing window 300. It is also to be noted that while in FIG. 4 the at least one assistance window 310 is displayed such that the window 310 does not overlap with the program editing window 300, the at least one assistance window 310 in FIG. 4 may partially overlap with the program editing window 300.

In this embodiment, displayed information that is displayed in the at least one assistance window 310 is at least one of: tool information, which is specifying tools Ta mountable on the machine tool 100; and control methods for controlling the tools Ta. That is, the display 240 (154) displays the program editing window 300 and the at least one assistance window 310 such that the windows 300 and 310 are arranged side by side. The program editing window 300 displays the program code 302 of the machining program 157, which is for controlling the machine tool 100. The at least one assistance window 310 displays at least one of: the tool information, which is specifying tools Ta mountable on the machine tool 100; and control methods for controlling the tools Ta. When the display 240 (154) is made up of a plurality of displays, one of the displays arranged side by side may display the program editing window 300, and another one of the displays may display the at least one assistance window 310. The tool information includes, for example: T numbers, which correspond to the respective tools Ta; names of the tools Ta; dimensions of the tools Ta; and/or a parameter for compensating for an error in machining. The control method for controlling a tool Ta includes a G code and an M code. That is, the control method includes a G code and a customized code that is other than the G code. Thus, the display 240 (154) displays, in one assistance window of the at least one assistance window 310, one code selected from a G code and a customized code that is other than the G code.

In FIG. 4, a tool data window 340 is displayed as the first assistance window 312, and a G-code list window 320 is displayed as the second assistance window 314. A main purpose of providing the tool data window 340 is to input the T number corresponding to a machining tool intended to be used. A main purpose of providing the G-code list window 320 is to input a G code. In the example illustrated in FIG. 4, however, the G-code list window 320 may be displayed in the first assistance window 312, and the tool data window 340 may be displayed as the second assistance window 314.

It is also to be noted that these windows are not intended as limiting the first assistance window 312 and the second assistance window 314. As described later, the first assistance window 312 and the second assistance window 314 may display any of the following windows, instead of the above-described windows: a tool offset window 360, which is for inputting the amount of position offset of the position of the cutting blade of the machining tool relative to a reference point of the tool spindle 114; an M-code list window 330, which is for inputting an M code; a macro variables window 380, which is for inputting a macro variable into the program; and a macro input window 390, in which a character set used in programming (character set) can be input easily. That is, the information displayed in the at least one assistance window 310 may include other information that is other than the tool information, which is specifying tools Ta, and control methods for controlling the tools Ta. The other information includes at least one of a macro variable specified in the program code 302 and a character set used in programming. The character set includes at least one of a function code specifying a mathematical function, an external output command, and an operator.

The display window 30 further includes a displayed-information selection window 316. The displayed-information selection window 316 is for selecting information to be displayed in the at least one assistance window 310 (this information will be hereinafter referred to as displayed information) from among the tool information, the control method, and the other information. That is, the display 240 (154) further displays the displayed-information selection window 316, which is for selecting information to be displayed in the at least one assistance window 310 from among the tool information, the control method, and the other information. In FIG. 4, the displayed-information selection window 316 is displayed between the program editing window 300 and the at least one assistance window 310. This arrangement, however, is not intended as limiting the display position of the displayed-information selection window 316. For example, in FIG. 4, the displayed-information selection window 316 may be displayed under or on the left side of the program editing window 300. From a programmer's visual recognizability standpoint, however, the displayed-information selection window 316 is preferably displayed between the program editing window 300 and the at least one assistance window 310.

In FIG. 4, character strings corresponding to the tool data window 340, the tool offset window 360, the macro variables window 380, the macro input window 390, the G-code list window 320, and the M-code list window 330 are displayed in a selection box in the displayed-information selection window 316. The programmer, by tapping or clicking on one of these character strings, selects information to be displayed in the at least one assistance window 310. It is to be noted that in the displayed-information selection window 316, inputting means other than a selection box may be displayed, examples including a radio button and a check box. In the example illustrated in FIG. 4, the character string "Tool data", which indicates a tool data window, is selected. Under the displayed-information selection window 316, a switch setting window 318 is displayed. The switch setting window 318 is for selecting one of the first assistance window 312 and the second assistance window 314. That is, the display 240 (154) displays the switch setting window 318, which is for selecting one of the first assistance window 312 and the second assistance window 314. In FIG. 4, the switch setting window 318 includes icons that schematically indicate positions of the first assistance window 312 and the second assistance window 314. By selecting either icon, the selected icon is activated. In the example illustrated in FIG. 4, the icon "1", which indicates the first assistance window 312, is active.

An OK button 317 is displayed under the displayed-information selection window 316. Upon manipulation of the OK button 317 by way of an operation such as tapping and clicking with the switch setting window 318 in the above-described state, the display content of the first assistance window 312 is switched to the tool data window. That is, the display 240 (154) displays, in the at least one assistance window 310, the displayed information selected in the displayed-information selection window 316. More specifically, the display 240 (154) displays, in the assistance window selected in the switch setting window 318, the displayed information selected in the displayed-information selection window 316. FIG. 4 illustrates a state in which the tool data window is displayed in the first assistance window 312 as a result of the above-described switch manipulation. In the following description, details of the G-code list window, the M-code list window, the tool data window, the tool offset window, the macro variables window, and the macro input window will be provided.

G-Code List Window

Figure 5:
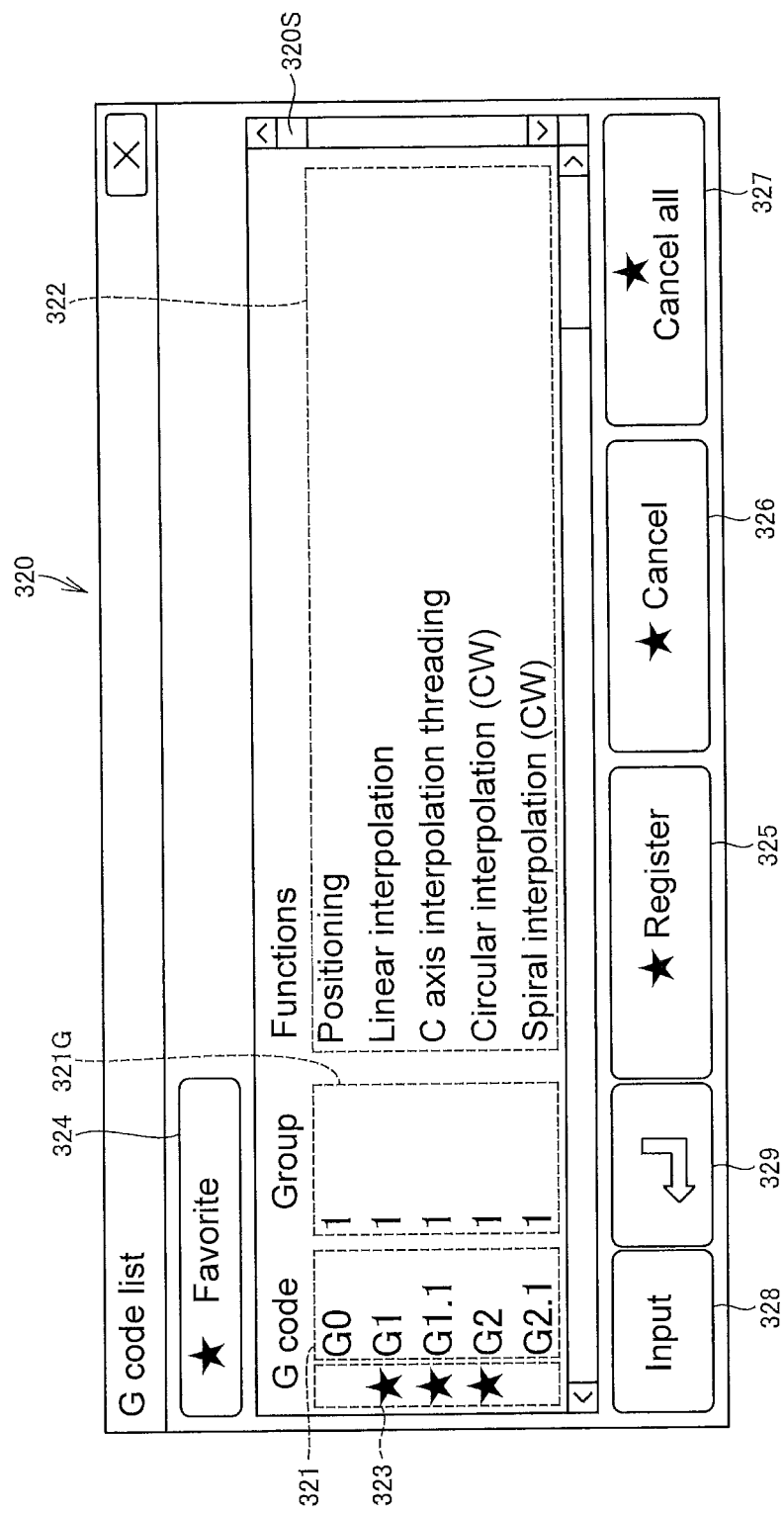
FIG. 5 illustrates an example of a G-code list window.
Figure 6:
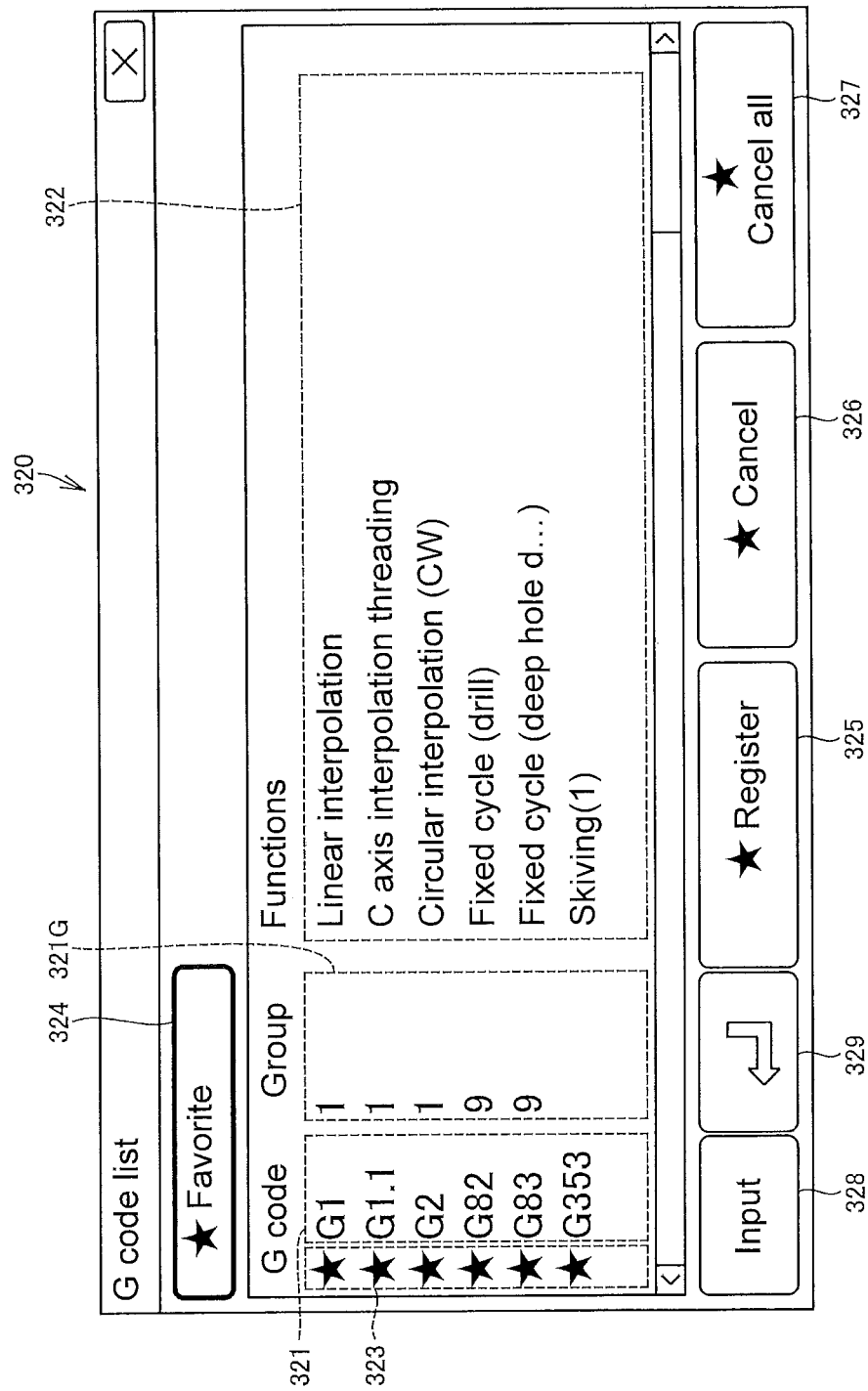
FIG. 6 illustrates another example of the G-code list window.

FIGS. 5 and 6 illustrate display examples of the G-code list window 320. Referring to FIGS. 5 and 6, G codes 321 are displayed on the left side of the G-code list window 320. On the right side of the G codes 321, group numbers 321G are displayed. The G codes 321 belong to the respective group numbers 321G. If a plurality of G codes of the same group number are displayed in one block (which is between ";" (EOB: End of Block) and ";" in the program code), only the last G code is executed. On the right side of the group numbers 321G, control contents 322 of the respective G codes 321 are displayed. On the left side of the G codes 321 marked as favorites, favorite marks 323 are added.

In an upper end portion of the G-code list window 320, a favorite representation button 324 is displayed. FIG. 5 illustrates the G-code list window 320 with the favorite representation button 324 in OFF state. FIG. 6 illustrates the G-code list window 320 with the favorite representation button 324 in ON state. As illustrated in FIG. 5, when the favorite representation button 324 is in OFF state, all the G codes are displayed in numerical order. In a right end portion of the G-code list window 320, a scroll bar 320S is displayed. The programmer, by moving the scroll bar 320S, is able to display a desired range of G codes in the G-code list window 320. As illustrated in FIG. 6, when the favorite representation button 324 is in ON state, only the favorite G codes are displayed as G codes 321. In FIG. 6, all the favorite G codes are smaller in number than the maximum displayable rows of the G-code list window 320. For this reason, the scroll bar is not displayed. When, however, the favorite G codes are larger in number than the maximum displayable rows of the G-code list window 320, the scroll bar is displayed. It is to be noted that while in FIGS. 5 and 6 the G codes are displayed in numerical order, the G codes 321 may be displayed in order of past usage frequency or in order of usage frequency in a predetermined period of time in the past.

In a lower right end portion of the G-code list window 320, buttons 325 to 327 are displayed. The buttons 325 to 327 are for registering and canceling favorites. The G code 321, the group number 321G, the control content 322, and the mark 323 are associated with each other and managed on a single-row basis. This ensures that upon manipulation of one of the G code 321, the group number 321G, and the control content 322 by clicking or tapping, the G code 321, the group number 321G, and the control content 322 that belong to the same row of the item that has been manipulated by clicking or tapping are selected and processed such as being displayed in inverted black and white. Upon manipulation of the favorite registration button 325 by clicking or tapping with the items in the above-described state, a favorite mark 323 is displayed on the left side of the selected G code 321. Thus, the selected G code 321 is managed as a favorite. Contrarily, upon manipulation by clicking or tapping of one of the G code 321, the group number 321G, the control content 322, and the mark 323 that belong to the row of a G code 321 registered as a favorite and upon manipulation of the favorite cancel button 326 by clicking or tapping, the selected G code 321 is canceled as a favorite, causing the favorite mark 323 on the left side of the selected G code 321 to disappear. Upon manipulation of the favorite all-cancel button 327 by clicking or tapping, a pop-up window appears to confirm whether all the favorites are to be canceled. Upon confirmation of the cancellation by the programmer, all the favorite G codes 321 are canceled from favorite management, causing all the marks 323 to disappear.

At the left end of a lower end portion of the G-code list window 320, an input button 328 is displayed. By referring to the program editing window 300 and the G-code list window 320, the programmer is able to input a G code into the program in the following manner. (1) In the program editing window 300, an insertion position at which a G code is to be inserted is specified by a manipulation such as tapping, clicking, and cursor movement (a position thus specified will be hereinafter referred to as insertion position). (2) By referring to the G-code list window 320, a row of G code 321 intended to be input is selected by tapping or clicking. (3) The input button 328 is tapped or clicked on. According to this procedure, the G code 321 selected in (2) is inserted into the program code 302 at the insertion position specified in (1).

Also in the lower end portion of the G-code list window 320, a line-feed key button 329 is displayed. Upon specification of an insertion position at which the line-feed character (";" (EOB)) is to be inserted in the program code 302 by a manipulation such as tapping, clicking, and cursor movement and upon manipulation of the line-feed key button 329 by clicking or tapping, a line-feed character (";" (EOB)) is inserted into the program code 302 at the insertion position. When an input is made using the line-feed key button 329, no input using the input button 328 is necessary. Before and after a G code, a line-feed character (";" (EOB)) is highly frequently inserted. In light of this fact, an EOB can be input using the line-feed key button 329 displayed in the G-code list window 320. This eliminates the need for displaying a separate screen keyboard for EOB inputting purposes in, particularly, the touch panel-equipped display 154 of the machine tool 100. As a result, programming in the machine tool 100 becomes more efficient.

It is to be noted that the above-described displaying way in which the G-code list window 320 illustrated in FIGS. 5 and 6 is displayed has been provided for exemplary purposes only; there are various other possible displaying ways. For example, the buttons and/or text may be displayed at positions other than the positions illustrated in FIGS. 5 and 6. For further example, the input button 328 may not necessarily be represented by text but may be represented by a symbol or a pattern, and the line-feed key button 329 may be represented by any other symbol or may be represented by a pattern or text. The favorite associated marks-buttons 323 to 327 may be represented by any other symbol or may be represented by a pattern or text. Otherwise, the buttons 323 to 327 may be deleted.

M-Code List Window

Figure 7:
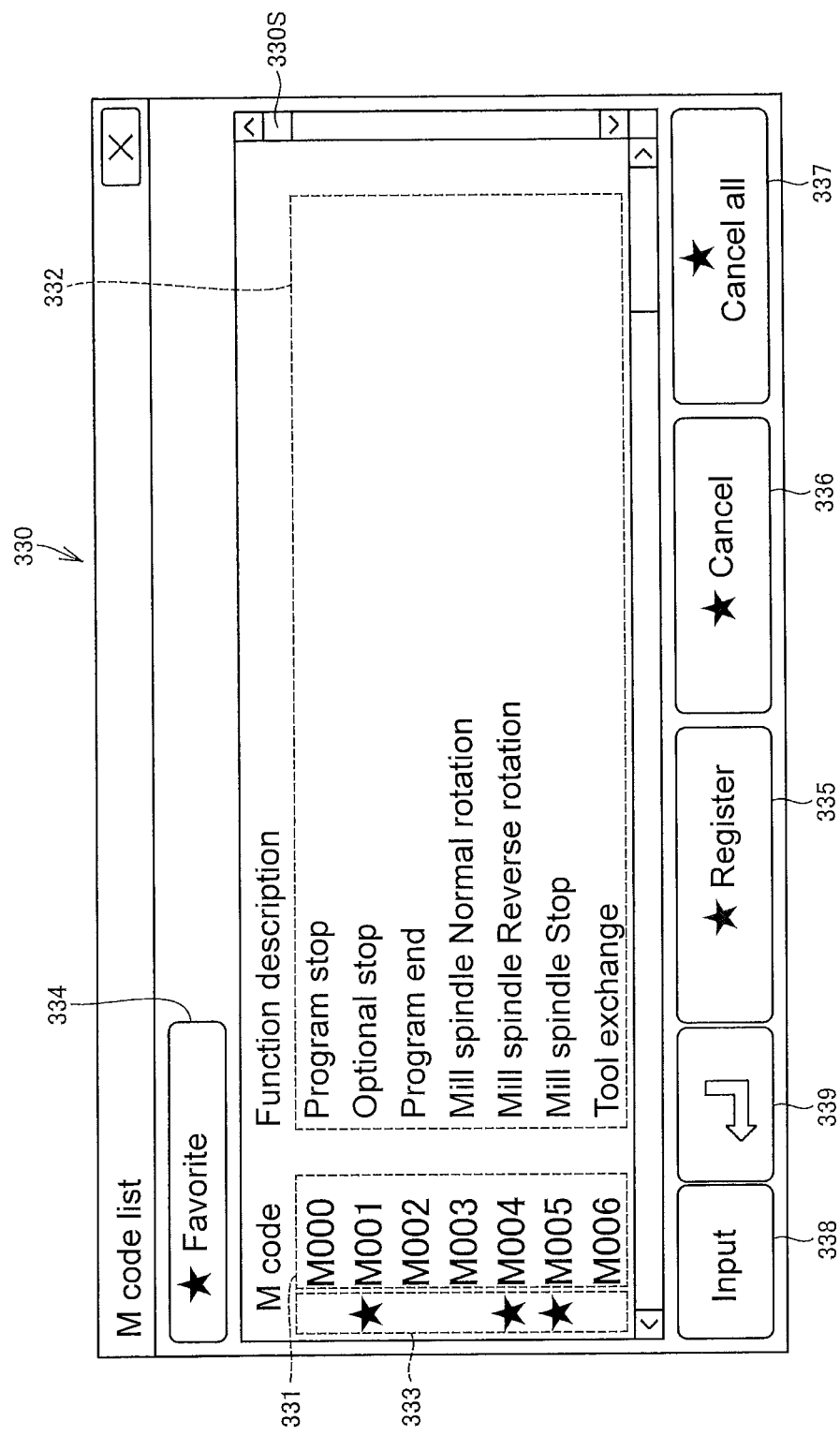
FIG. 7 illustrates an example of M-code list window.
Figure 8:
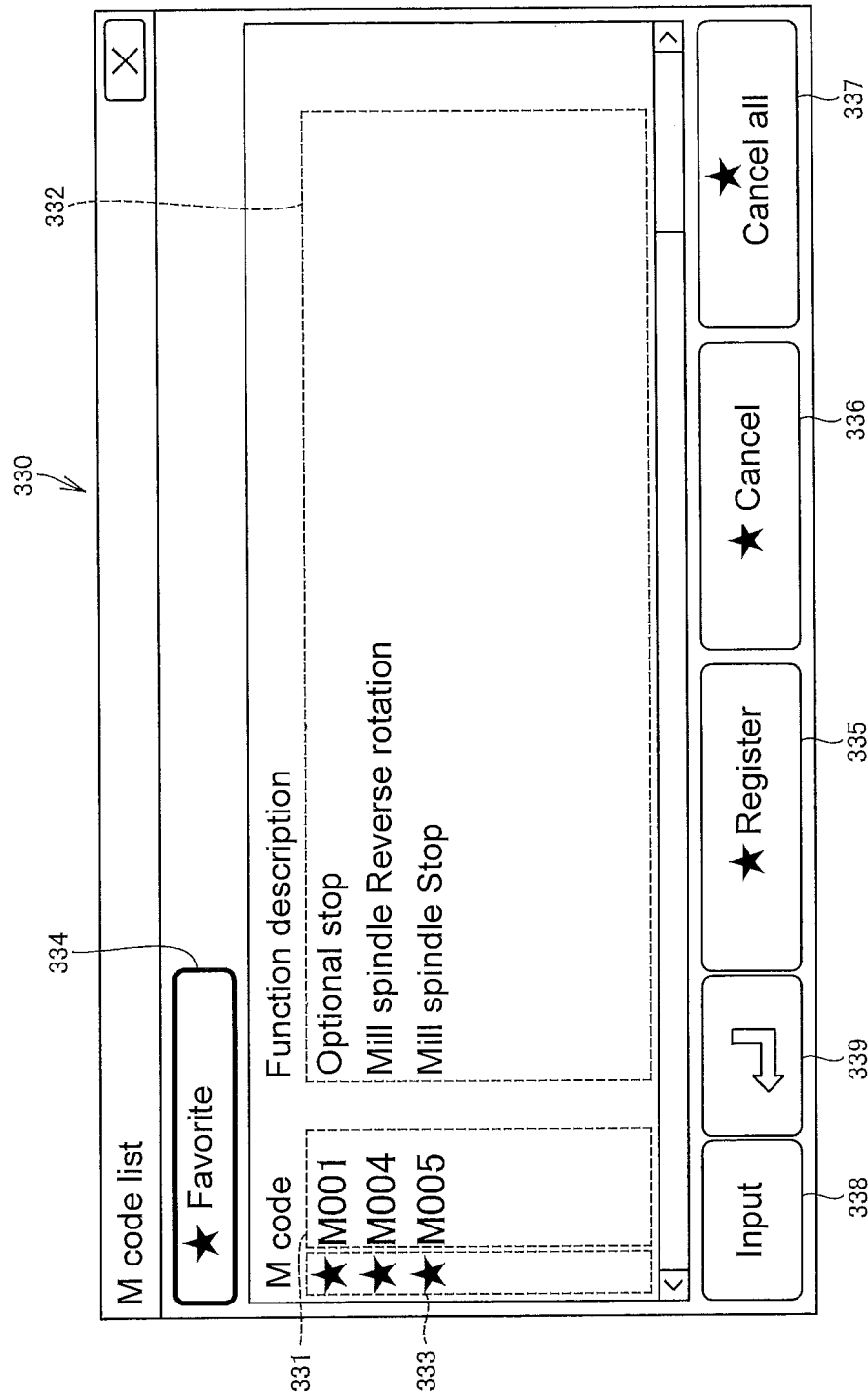
FIG. 8 illustrates another example of the M-code list window.

FIGS. 7 and 8 illustrate examples in which the M-code list window 330 is displayed. Referring to FIGS. 7 and 8, M codes 331 are displayed in a left side portion of the M-code list window 330. On the right side of the M codes 331, control contents 332 of the M codes 331 are displayed. On the left side of the M codes 331 marked as favorites, favorite marks 333 are added.

In an upper end portion of the M-code list window 330, a favorite representation button 334 is displayed. FIG. 7 illustrates the M-code list window 330 with the favorite representation button 334 in OFF state. FIG. 8 illustrates the M-code list window 330 with the favorite representation button 334 in ON state. As illustrated in FIG. 7, when the favorite representation button 334 is in OFF state, all the M codes are displayed in numerical order. In a right end portion of the M-code list window 330, a scroll bar 330S is displayed. The programmer, by moving the scroll bar 330S, is able to display a desired range of M codes in the M-code list window 330. As illustrated in FIG. 8, when the favorite representation button 334 is in ON state, only the favorite M codes are displayed as M codes 331. In FIG. 8, all the favorite M codes are smaller in number than the maximum displayable rows of the M-code list window 330. For this reason, the scroll bar is not displayed. When, however, the favorite M codes are larger in number than the maximum displayable rows of the M-code list window 330, the scroll bar is displayed. It is to be noted that while in FIGS. 7 and 8 the M codes are displayed in numerical order, the M codes 331 may be displayed in order of past usage frequency or in order of usage frequency in a predetermined period of time in the past.

In a lower right end portion of the M-code list window 330, buttons 335 to 337 are displayed. The buttons 335 to 337 are for registering and canceling favorites. The M code 331, the control content 332, and the mark 333 are associated with each other and managed on a single-row basis. This ensures that upon manipulation of one of the M code 331 and the control content 332 by clicking or tapping, the M code 331 and the control content 332 that belong to the same row of the item that has been manipulated by clicking or tapping are selected and processed such as being displayed in inverted black and white. Upon manipulation of the favorite registration button 335 by clicking or tapping with the items in the above-described state, a favorite mark 333 is displayed on the left side of the selected M code 331. Thus, the selected M code 331 is managed as a favorite. Contrarily, upon manipulation by clicking or tapping of one of the M code 331, the control content 332, and the mark 333 that belong to the row of a M code 331 registered as a favorite and upon manipulation of the favorite cancel button 336 by clicking or tapping, the selected M code 331 is canceled as a favorite, causing the favorite mark 333 on the left side of the selected M code 331 to disappear. Upon manipulation of the favorite all-cancel button 337 by clicking or tapping, a pop-up window appears to confirm whether all the favorites are to be canceled. Upon confirmation of the cancellation by the programmer, all the favorite M codes 331 are canceled from favorite management, causing all the marks 333 to disappear.

At the left end of a lower end portion of the M-code list window 330, an input button 338 is displayed. By referring to the program editing window 300 and the M-code list window 330, the programmer is able to input an M code into the program in the following manner. (1) In the program editing window 300, an insertion position at which an M code is to be inserted is specified by a manipulation such as tapping, clicking, and cursor movement. (2) By referring to the M-code list window 330, a row of the M code 331 intended to be input is selected by tapping or clicking. (3) The input button 338 is tapped or clicked on. Thus, the selected M code 331 is inserted into the program code 302.

Also in the lower end portion of the M-code list window 330, a line-feed key button 339 is displayed. Upon specification of an insertion position at which the line-feed character (";" (EOB)) is to be inserted in the program code 302 by a manipulation such as tapping, clicking, and cursor movement and upon manipulation of the line-feed key button 339 by clicking or tapping, a line-feed character (";" (EOB)) is inserted into the program code 302 at the insertion position. When an input is made using the line-feed key button 339, no input using the input button 338 is necessary. Before and after an M code, a line-feed character (";" (EOB)) is highly frequently inserted. In light of this fact, an EOB can be input using the line-feed key button 339 displayed in the M-code list window 330. This eliminates the need for displaying a separate screen keyboard for EOB inputting purposes in, particularly, the touch panel-equipped display 154 of the machine tool 100. As a result, programming in the machine tool 100 becomes more efficient.

It is to be noted that the above-described displaying way in which the M-code list window 330 illustrated in FIGS. 7 and 8 is displayed has been provided for exemplary purposes only; there are various other possible displaying ways. For example, the buttons and/or text may be displayed at positions other than the positions illustrated in FIGS. 7 and 8.

For further example, the input button 338 may not necessarily be represented by text but may be represented by a symbol or a pattern, and the line-feed key button 339 may be represented by any other symbol or may be represented by a pattern or text. The favorite associated marks-buttons 333 to 337 may be represented by any other symbol or may be represented by a pattern or text. Otherwise, the buttons 333 to 337 may be deleted.

Tool Data Window

Figure 9:
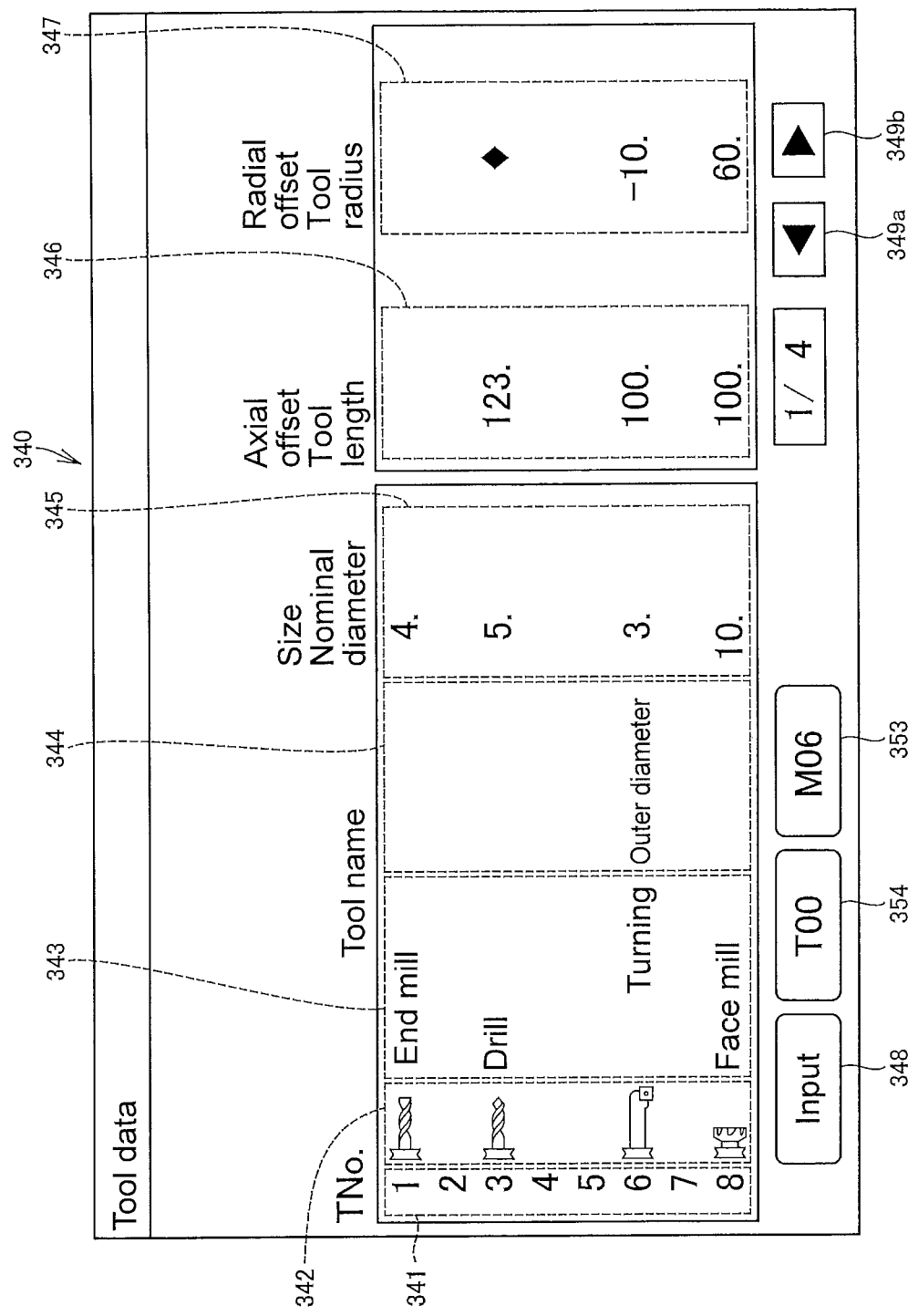
FIG. 9 illustrates an example of a tool data window.
Figure 10:
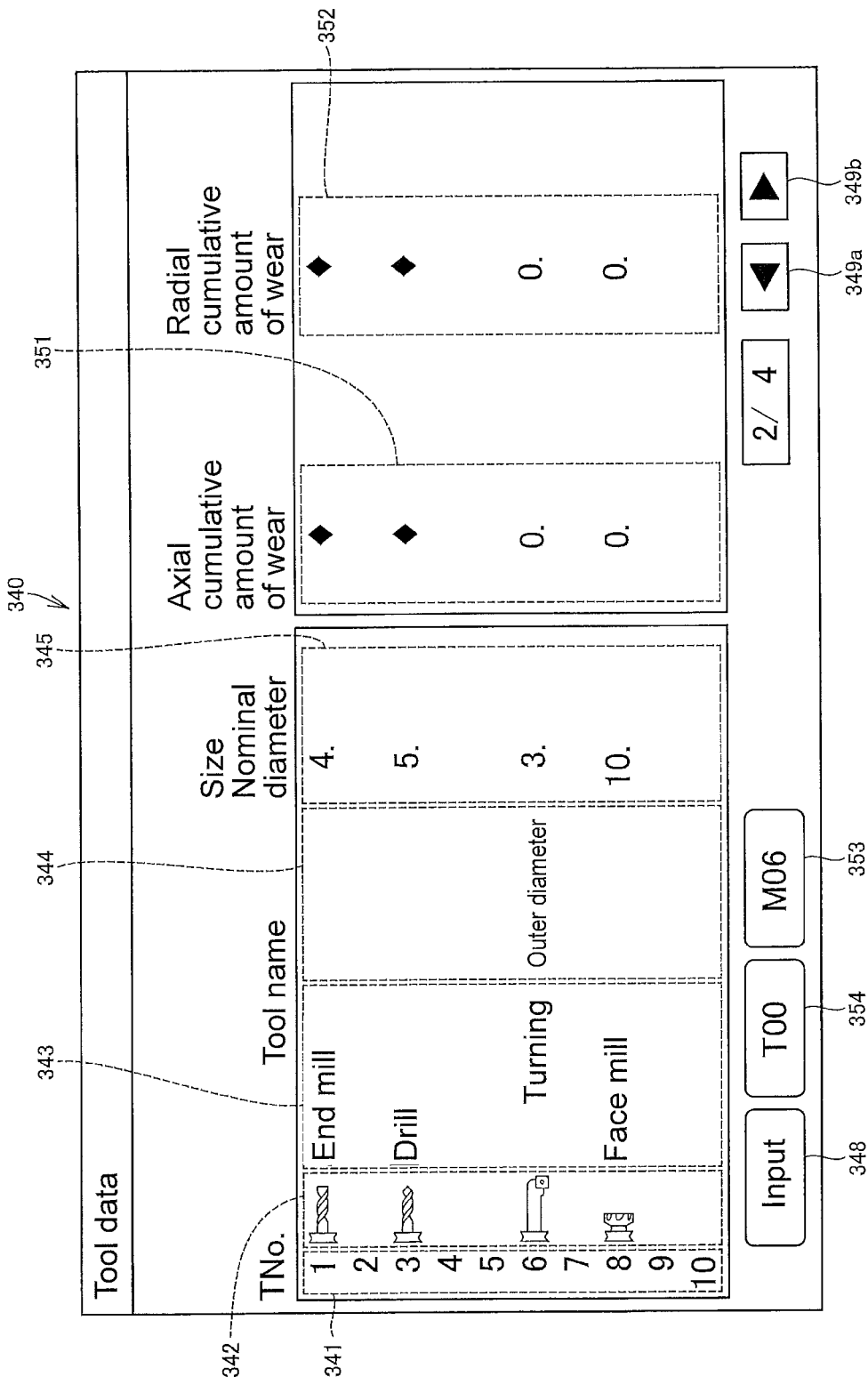
FIG. 10 illustrates another example of the tool data window.

FIGS. 9 and 10 illustrate examples in which the tool data window 340 is displayed. Referring to FIGS. 9 and 10, in a left end portion of the tool data window 340, T numbers 341 are displayed. The T numbers 341 correspond to respective tools Ta. On the right side of the T numbers 341, symbols 342 are displayed. The symbols 342 schematically represent the respective tools Ta. The symbols 342 may be omitted. On the right side of the symbols 342, tool names 343 of the respective tools Ta are displayed. Some tools, such as a turning tool (in this example, T06), are assigned machined part names 344 on the right side of the tool names 343. On the right side of the tool names 343 (or on the right side of the name 344, when the name 344 is assigned), numerical values 345 are displayed. The numerical values 345 are values of the sizes or the nominal diameters of the respective tools Ta. A decimal point is added at the end of each numerical value 345, meaning that the part of the value on the left side of the decimal point is in mm units. In the examples illustrated in FIGS. 9 and 10, a size is displayed only on the turning tool (T06), and a nominal diameter is displayed on each of the rest of the tools. Whether size or nominal diameter is displayed as a numerical value 345 depends on the kind of the tool.

Further to the right of the numerical values 345, a plurality of parameters are displayed. The plurality of parameters may be omitted when a tool corresponding to a T number 341 can be easily handled based on one of the tool name 343 and the numerical value 345. In the examples illustrated in FIGS. 9 and 10, a parameter of the end mill (T01) is not displayed. Also, in a lower right corner portion of the tool data window 340, arrow buttons 349a and 349b are displayed. By tapping or clicking on the arrow buttons 349a and 349b, the range of the T numbers 341 displayed in the tool data window 340 can be changed.

Referring to FIG. 9, on the right side of the numerical values 345, numerical values 346 are displayed. The numerical values 346 are values of tool length or axial offset. As used herein, the term "tool length" is intended to mean the length of a tool Ta in the direction along the rotation axis A2 (this direction will be hereinafter referred to as axial direction) where the tool Ta is mounted on the tool spindle 114. In other words, the tool length is the length of the tool Ta in the Zm axis direction in the machine coordinate system. As used herein, the term "axial offset" is intended to mean the distance in the axial direction between the base end point of the tool Ta and the tool tip of the tool Ta where the tool Ta is mounted on the tool spindle 114. As used herein, the phrase "base end point of the tool Ta" is intended to mean one end point of the tool Ta mounted on the tool spindle 114. The one end point is one of two end points of the tool Ta that are along the axial direction of the tool Ta, and belongs to the part of the tool Ta to be held by the tool spindle 114. In other words, the axial offset is the distance in the Zm axis direction between the base end point and the tool tip of the tool Ta in the machine coordinate system. In the example illustrated in FIG. 9, an axial offset is displayed only on the turning tool (T06), and a tool length is displayed on each of the rest of the tools. Whether tool length or axial offset is displayed as a numerical value 346 depends on the kind of the tool.

Referring to FIG. 9, a numerical value 347 is displayed in a right end portion of the tool data window 340. The numerical value 347 is a value of tool radius or radial offset. It is to be noted that while tool radius is displayed in this embodiment, tool diameter may be displayed, instead of tool radius. As used herein, the term "tool radius" is intended to mean the radius of an un-worn (new) tool Ta in a direction perpendicular to the rotation axis A2 (this direction will be hereinafter referred to as radial direction) where the tool Ta is mounted on the tool spindle 114. As used herein, the term "radial offset" is intended to mean a coordinate value in the radial direction of an un-worn (new) tool Ta from the base end point of the tool Ta to the cutting edge of the tool Ta where the tool Ta is mounted on the tool spindle 114. When the posture of the tool headstock 112 is as illustrated in FIG. 1, the coordinate value is the value of the Xm coordinate of the cutting edge of the tool Ta where the tool Ta is mounted on the tool spindle 114. In the example illustrated in FIG. 9, the tool radius of the drill (T03) can be calculated from the nominal diameter. For this reason, the numerical value 347 is not displayed. In respect of the turning tool (T06), a radial offset is displayed as a numerical value 347. In respect of the face mill (T08), a tool radius is displayed as a numerical value 347. Whether tool radius or axial offset is displayed as a numerical value 347 and whether to omit display of a numerical value 347 depend on the kind of the tool.

Referring to FIG. 10, on the right side of the numerical values 345, numerical values 351 are displayed. The numerical values 351 are values of the axial cumulative amount of wear. As used herein, the term "axial cumulative amount of wear" is intended to mean a cumulative amount of wear of the tool tip of the tool Ta in its axial direction. The cumulative amount of wear is the amount of wear of the tool Ta accumulating through use of the tool Ta, and can be calculated by the machine tool 100 based on how the tool Ta is used and/or how long the tool Ta is used. Another possible example is that the programmer or worker inputs the cumulative amount of wear while checking how the tool Ta is used. The programmer, by check the cumulative amount of wear, is able to know whether the tool Ta is being used approximately and/or the exchange time to exchange the tool Ta. It is to be noted that the cumulative amount of wear may not necessarily be displayed. In the example illustrated in FIG. 10, no numerical values 351 are displayed in the rows of the end mill (T01) and the drill (T03). Also in the right end portion of the tool data window 340, numerical values 352 are displayed. The numerical values 352 are values of the radial cumulative amount of wear. As used herein, the term "radial cumulative amount of wear" is intended to mean the cumulative amount of wear of the cutting edge of the tool Ta in its radial direction. In the example illustrated in FIG. 10, no numerical values 352 are displayed in the rows of the end mill (T01) and the drill (T03). In the tool data window 340, other tool information than those described above may be displayed, which will be described in detail by referring to a tool data window modification 340a, described later.

The T number 341, the symbol 342, the tool name 343, the machined-part name 344, and the numerical values 345 to 347, 351, and 352 are associated with each other on a single-row basis, and are associated with a T number in the program code 302. Thus, tool information 158 associated with the T numbers 341 in the program code 302 will be referred to as first tool information. The tool information includes the first tool information, and the first tool information includes at least one of a reference number 361, an X value 362, a Y value 363, a Z value 364, an R value 365, the T number 341, the symbol 342, the tool name 343, the machined-part name 344, and the numerical values 345 to 347, 351, and 352, as described later. The first tool information includes cumulative amounts of wear 351 and 352, which are amounts of wear accumulating through use of the tool.

At the left end of a lower end portion of the tool data window 340, an input button 348 is displayed. By referring to the program editing window 300 and the tool data window 340, the programmer is able to, in the following manner, a T number of a tool suitable for machining into the program. (1) In the program editing window 300, an insertion position at which a T number is to be inserted is specified by a manipulation such as tapping, clicking, and cursor movement. (2) By referring to the tool data window 340, a row in which a tool suitable for machining is displayed is selected by tapping or clicking. (3) The input button 348 is tapped or clicked on. According to this procedure, a T number corresponding to the tool selected in (2) is inserted at the insertion position in the program code 302 specified in (1). It is to be noted that in this embodiment, it is possible to add "00" to the end of the two-digit T number 341 and to use the resulting number as a T number.

Also in the tool data window 340, the programmer is able to edit values of axial offset, radial offset, and amount of wear, among the values displayed in the tool data window 340. This editing operation can be performed according to, for example, the following procedure. (1) On the tool data window 340, a position to edit is selected by a manipulation such as tapping, long pressing, and clicking, making the position into an editable state (for example, displaying the position in the form of a form tag). (2) When the tool data window 340 is displayed on a touch panel-equipped display such as in the controller 150 of the machine tool 100, an input interface such as a screen keyboard and a screen numeric keyboard is additionally displayed. (3) A value is input using the keyboard or the input interface on the screen displayed in (2). It is to be noted that the above-described tapping or clicking may be a single tapping or a single clicking, or may be a double tapping or a double clicking. It is also to be noted that the editing method will not be limited to the above-described method; it is possible to use any other means such as other GUIs and sound inputting. It is also possible to edit axial offset, radial offset, and/or amount of wear using a program other than the machining-program editing program 221 (159).

Also in the lower end portion of the tool data window 340, an M06 command input button 353 is displayed. The M06 command input button 353 is for inputting an M06 command into the program code 302. As used herein, the term "M06 command" is intended to mean a tool exchange command. In the program code, the M06 command is described as: <T code of a tool to be exchanged><T code of a tool next to be exchanged> M06;

An insertion position at which an M06 command is to be inserted into the program code 302 may be specified by a manipulation such as tapping, clicking, and cursor movement. Upon manipulation of the M06 command input button 353 by clicking or tapping with the insertion position in thus selected state, the code of the M06 command is inserted at the specified insertion position. When an input is made using the M06 command input button 353, an input into the input button 348 is not necessary. While it is possible to input an M06 command from the M-code list window 330, considering that an M06 command is highly associated with a T code, a higher level of programming convenience is provided if an M06 command is input directly from the tool data window 340. Thus, by displaying the M06 command input button 353 in the tool data window 340, programming becomes more efficient.

Also in the lower end portion of the tool data window 340, a T00 input button 354 is displayed. The T00 input button 354 is for inputting, into the program code 302, a T number that does not specify a tool. T00 is a T number specifying that no tool is to be mounted on the tool spindle 114 or that no tool is to be mounted on the magazine arm 132. For example, when there is no tool next to be exchanged at the tool exchange time, a code indicating T00 is described in the above-described <T code of a tool next to be exchanged> of the program code. An insertion position at which T00 is to be inserted into the program code 302 may be specified by a manipulation such as tapping, clicking, and cursor movement. Upon manipulation of the T00 input button 354 by clicking or tapping with the insertion position in thus specified state, a code indicating T00 is inserted at the specified insertion position. When an input is made using the T00 input button 354, an input into the input button 348 is not necessary. While T00 may be input from some other inputting means (such as a keyboard (which is one input interface 250) and a screen keyboard additionally displayed in the display window 30), T00 is frequently used in combination with an M06 command. In light of this fact, if the T00 input button 354 is displayed in the same window (the tool data window 340) as the window in which the M06 command input button 353 is displayed, programming becomes more efficient.

It is to be noted that the displaying way in which the tool data window 340 is displayed as illustrated in FIGS. 9 and 10 has been provided for exemplary purposes only; there are various other possible displaying ways. For example, the buttons and/or text may be displayed at positions other than the positions illustrated in FIGS. 9 and 10. For further example, the input button 348 may not necessarily be represented by text but may be represented by a symbol or a pattern, and the arrow buttons 349a and 349b may be represented by any other symbol or may be represented by a pattern. It is to be noted that while In FIGS. 9 and 10 the tools Ta are displayed in T numerical order in the tool data window 340, the tools Ta may be displayed in order of past usage frequency or in order of usage frequency in a predetermined period of time in the past. It is also to be noted that the numerical values 346 and 347 may be used as one tool length offset, described later. This will be described by referring to the tool data window modification 340a, described later.

Tool Offset

Figure 12:
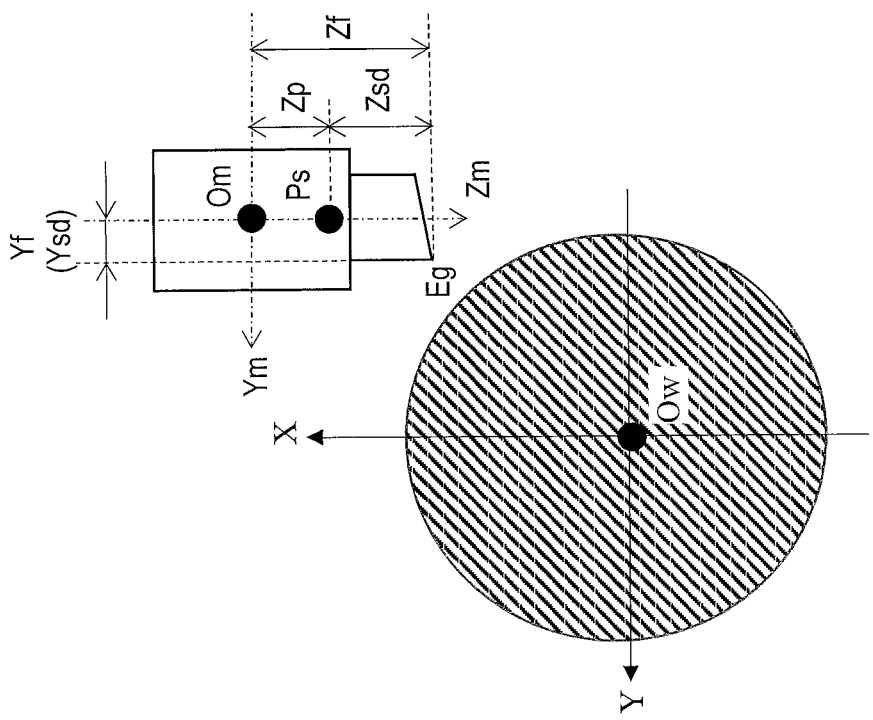
FIG. 12 illustrates a concept of a tool length offset compensation.
Figure 11:
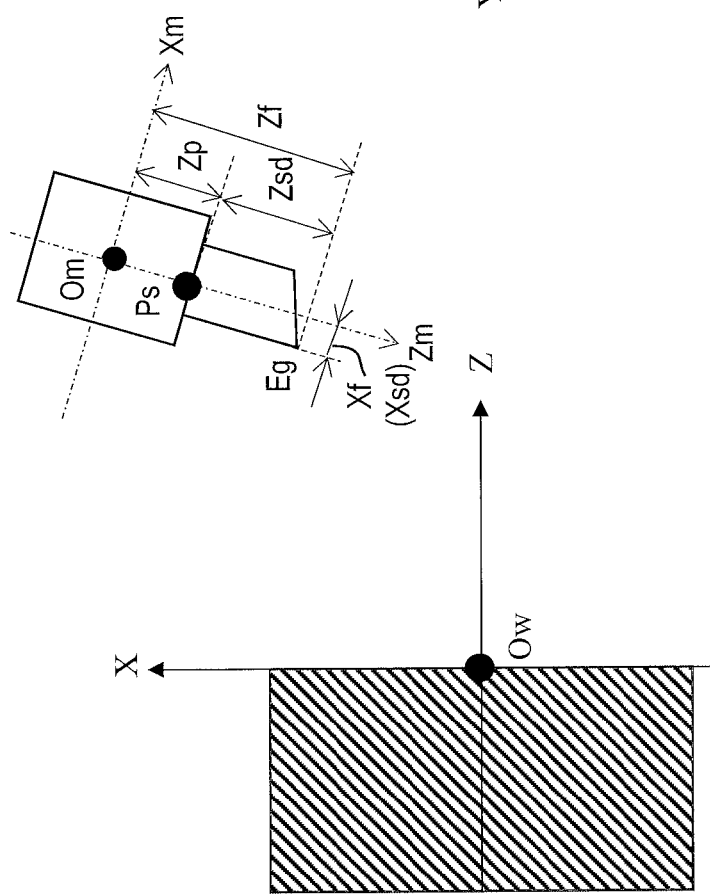
FIG. 11 illustrates a concept of a tool length offset compensation.

Next, description will be made with regard to, as part of a description of the tool offset window 360, a concept tool length compensation, a tool radius compensation, and a nose R compensation, which are specified in the tool offset window 360. As used herein, the term "tool length compensation" is intended to mean compensating for a position offset between a reference point Ps and the tool tip of the tool Ta. As illustrated in FIGS. 11 and 12, the reference point Ps is located on the Zm axis, which passes through a machine origin Om. The reference point Ps coincides with the base end point of the tool Ta where the tool Ta is mounted on the tool spindle 114, as described above. The position of the tool tip of the tool Ta relative to the machine origin Om varies widely depending on the kind of the tool Ta and/or a worn state of the tool Ta. In light of this fact, while in the machining program 157 the program code is described as if the machine origin Om passes through the machining position of the workpiece W1, the position of the tool tip of the tool Ta relative to the machine origin Om is managed as a tool length offset and separately from programed movements. The machine tool 100 compensates for the tool length offset and executes the machining program 157.

Specifically, as illustrated in FIGS. 11 and 12, the tool length offset is defined by the position (Xf; Yf; Zf) of the tool tip Eg of the tool Ta relative to the machine origin Om in the machine coordinate system. Xf is the Xm coordinate of the tool tip Eg of the tool Ta. Yf is the Ym coordinate of the tool tip Eg of the tool Ta. Zf is the Zm coordinate of the tool tip Eg of the tool Ta. Xf coincides with an Xm coordinate Xsd of the tool tip Eg where the reference point Ps in the tool spindle 114 is regarded as the origin of the machine coordinate system. Yf coincides with a Ym coordinate Ysd of the tool tip Eg where the reference point Ps is regarded as the origin of the machine coordinate system. Zf is the sum of a Zm coordinate Zp of the reference point Ps and a Zm coordinate Zsd of the tool tip Eg where the reference point Ps is regarded as the origin of the machine coordinate system. Zp is determined in advance by specifications of the machine tool 100.

(Xsd, Ysd, Zsd) is obtained by adding shape offset and wear compensation parameter to each other. As used herein, the term "shape offset" is intended to mean Xm, Ym, and Zm coordinates (Xs, Ys, Zs) relative to the tool tip Eg of an un-worn (new) tool Ta mounted on the tool spindle 114 where the base end point (the reference point Ps in the tool spindle 114) of the tool Ta is regarded as the origin. Zs coincides with the above-described axial offset of the tool Ta. In a tool whose radial shape is approximately circular, such as a drill, Xs and Ys coincide with the above-described radial offset. The wear compensation parameter is a representation of, in the machine coordinate system, the amount of offset from the above-described shape offset as a result of wear of the tool Ta. Where the Xm coordinate value, the Ym coordinate value, and the Zm coordinate value of the wear compensation parameter are assumed as Xd, Yd, and Zd, respectively, the tool length offset Xf; Yf; Zf is represented by the following Formulae.

$$Xf = Xsd = Xs + Xd$$

$$Yf = Ysd = Ys + Yd$$

$$Zf = Zp + Zsd = Zp + Zs + Zd$$

Next, a concept of the tool radius compensation will be described. As used herein, the term "tool radius compensation" is intended to mean compensating for a position offset between the reference point Ps and the cutting edge of the tool Ta in milling and/or drilling (this position offset is a position offset at a periphery portion of the tool Ta constituting the maximum radius of the tool Ta and as seen from the direction of the rotation axis A2 of the tool Ta). The position of the cutting edge of the tool Ta relative to the machine origin Om varies widely depending on the kind of the tool Ta and/or a worn state of the tool Ta. In light of this fact, while in the machining program 157 the program code is described as if the machine origin Om passes through the machining position of the workpiece W1, the position of the cutting edge of the tool Ta relative to the machine origin Om is separately managed as a tool radius offset. The machine tool 100 compensates for the tool radius offset and executes the machining program 157.

Figure 13:
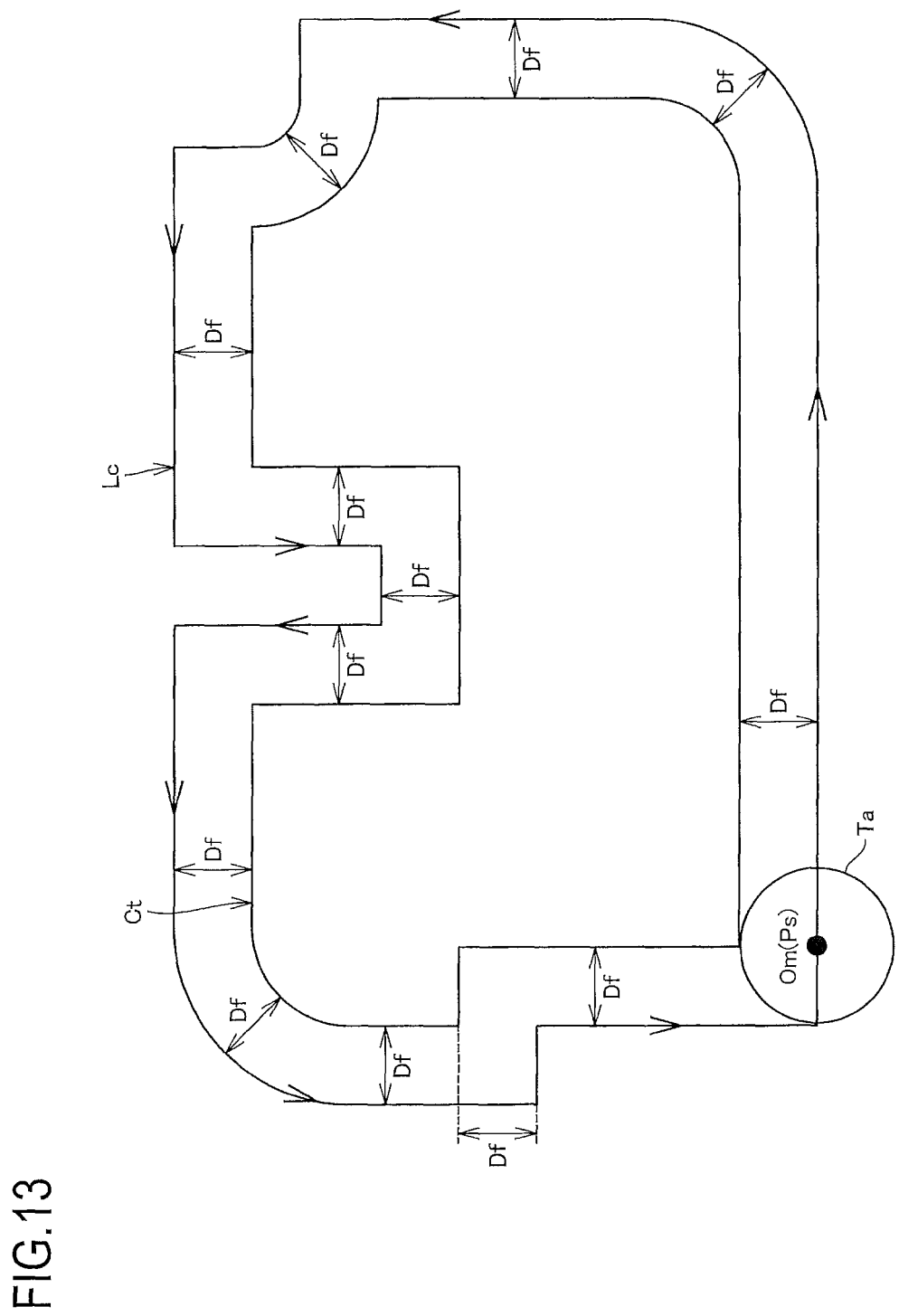
FIG. 13 illustrates a concept of a tool radius compensation.

FIG. 13 illustrates an example path Lc of a tool in a case of tool radius compensation performed when milling is performed on the circumstance of a target contour Ct. In FIG. 13, a tool radius offset Df is the distance between the machine origin Om and the cutting edge of the tool Ta as seen from the direction of the rotation axis A2 of the tool Ta. By performing a tool radius compensation, the machine origin Om of the tool Ta is controlled to move along the path Lc, which is spaced apart from the target contour Ct by a distance equal to or more than the tool radius offset Df By giving whether a compensation is performed on the inside of the target contour Ct or on the outside of the target contour Ct, the path Lc can be obtained mathematically by a known method (in an NC program, a G41 command or a G42 command is used to specify whether the right side or the left side of the blade in its progress direction is used).

Figure 14:
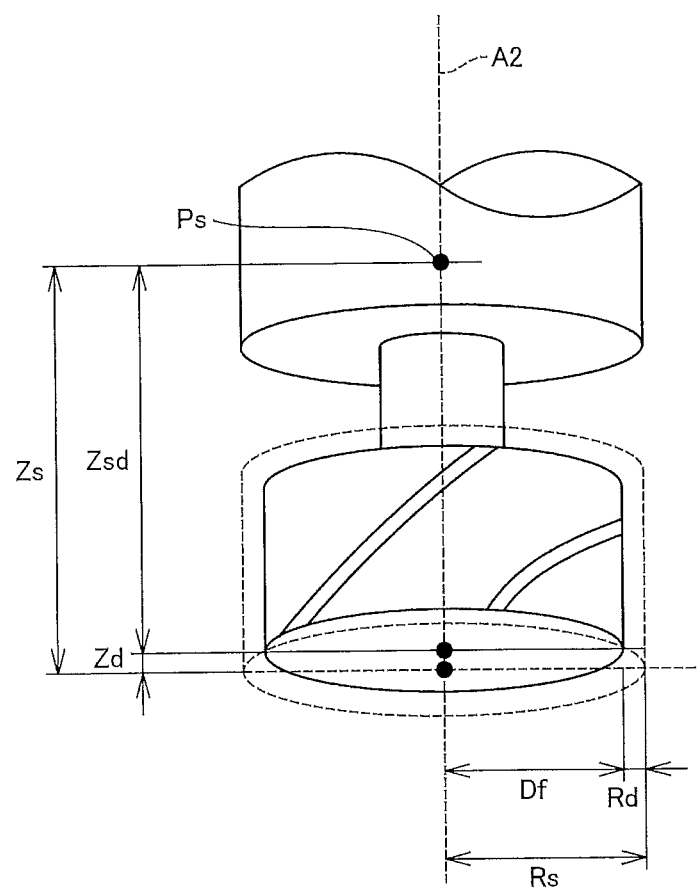
FIG. 14 illustrates a tool radius offset seen in a milling tool.

FIG. 14 illustrates a tool radius offset Df seen in a milling tool. While in FIG. 14 an example tool radius offset Df of the milling tool is illustrated, this example also applies in a drill used in drilling. Where the tool radius is assumed as Rs and the amount of radial wear of the tool Ta Rd relative to the rotation axis A2 is assumed as Rd, the tool radius offset Df is represented by the following Formula.

$$Df = Rs + Rd$$

Figure 15:
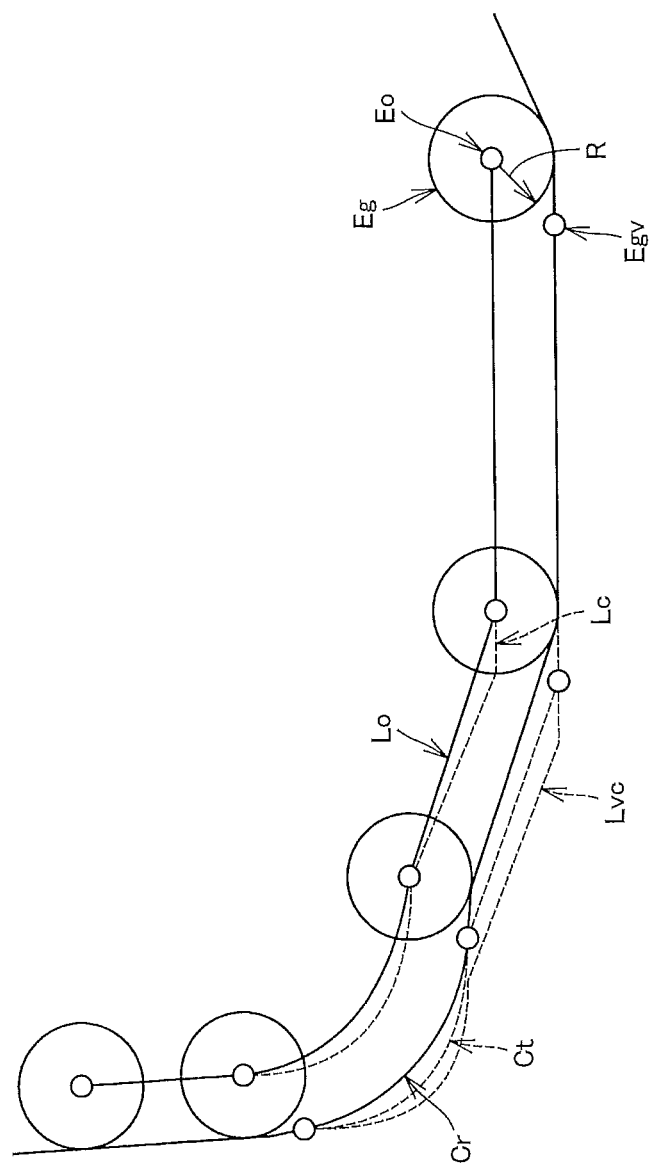
FIG. 15 illustrates a concept of a nose R compensation.

Next, a concept of the nose R compensation (nose radius compensation) will be described. Generally, the nose of a tool is round. For this reason, an imaginary tool tip Egv, which is defined based on the tool length offset, does not contact the workpiece W1; instead, it is a cutting edge Eg that contacts the workpiece W1. The cutting edge Eg has a shape defined by an arc that has a curvature radius R and that is different from the imaginary tool tip Egv. Under the circumstances, if programming is performed with the leading end of the tool assumed as the imaginary tool tip Egv, a resulting contour Cr is offset from the target contour Ct, as illustrated in FIG. 15. FIG. 15 illustrates an example in which, because of the imaginary tool tip Egv being located on the outer side of the cutting edge Eg, the center, Eo, of the arc of the curvature radius R passes through a path Lo, which is apart from the target contour Ct largely beyond the curvature radius R, resulting in the contour Cr, which is offset from the target contour Ct. As used herein, the term "nose R compensation" is intended to mean compensating for the movement path of the imaginary tool tip Egv based on: the direction from the center Eo of the arc that defines the shape of the cutting edge Eg in the workpiece coordinate system toward the imaginary tool tip Egv (this direction is equivalent to the nose direction); and the curvature radius R of the arc so that the path of the center Eo of the arc coincides with the path Lc, which is apart from the target contour Ct by the curvature radius R. By performing this nose R compensation, the path of the imaginary tool tip Egv is compensated for to become a path Lvc, which is inner in the workpiece W1 than the target contour Ct, as illustrated in FIG. 15. It is to be noted that the movement path of the machine origin Om can be obtained from the path Lvc of the imaginary tool tip Egv using a tool length compensation.

Figure 16:
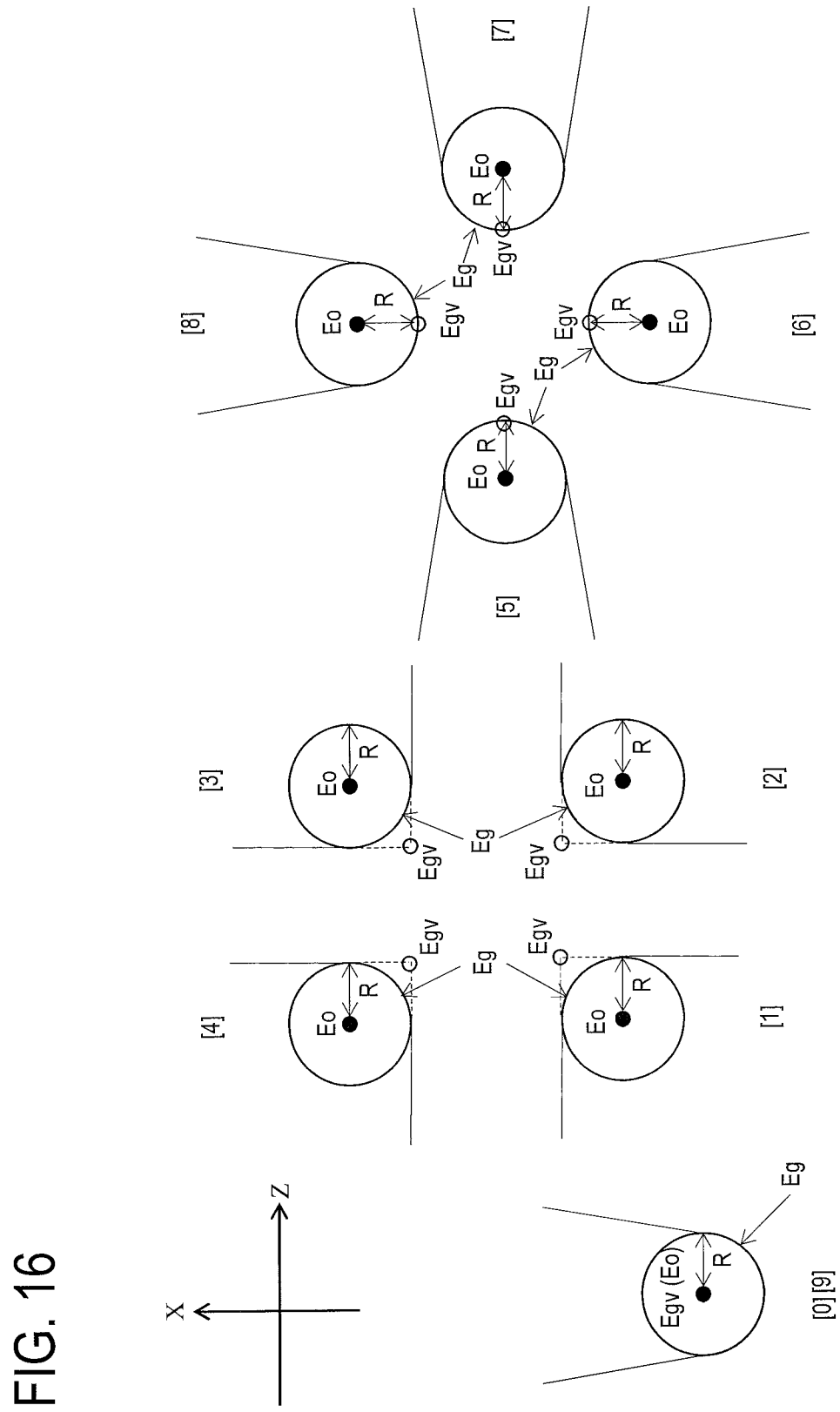
FIG. 16 illustrates a concept of a nose direction.

FIG. 16 illustrates examples of the nose direction. FIG. 16 illustrates a total of nine nose directions; eight nose directions plus a nose direction [0] (and a nose direction [9]), which indicates a special cutting edge corresponding to all nose directions perpendicular to the Y axis of the workpiece coordinate system. A nose direction [1] is a direction toward the X axis positive direction and the Z axis positive direction of the workpiece coordinate system. A nose direction [2] is a direction toward the X axis positive direction and the Z axis negative direction of the workpiece coordinate system. A nose direction [3] is a direction toward the X axis negative direction and the Z axis negative direction of the workpiece coordinate system. A nose direction [4] is a direction toward the X axis negative direction and the Z axis positive direction of the workpiece coordinate system. A nose direction [5] is a direction toward the Z axis positive direction of the workpiece coordinate system. A nose direction [6] is a direction toward the X axis positive direction of the workpiece coordinate system. A nose direction [7] is a direction toward the Z axis negative direction of the workpiece coordinate system. A nose direction [8] is a direction toward the X axis negative direction of the workpiece coordinate system.

Where the coordinates of the center Eo of the arc in the workpiece coordinate system are assumed as (Xo, Yo, Zo), the coordinates, (Xgv, Ygv, Zgv), of the imaginary tool tip Egv in the workpiece coordinate system are determined as follows.
Nose direction [1]: (Xgv, Ygv, Zgv)=(Xo+R, Yo, Zo+R).
Nose direction [2]: (Xgv, Ygv, Zgv)=(Xo+R, Yo, Zo −R).
Nose direction [3]: (Xgv, Ygv, Zgv)=(Xo−R, Yo, Zo −R).
Nose direction[4]: (Xgv, Ygv, Zgv)=(Xo−R, Yo, Zo+R).
Nose direction [5]: (Xgv, Ygv, Zgv)=(Xo, Yo, Zo+R).
Nose direction [6]: (Xgv, Ygv, Zgv)=(Xo+R, Yo, Zo).
Nose direction [7]: (Xgv, Ygv, Zgv)=(Xo, Yo, Zo −R).
Nose direction [8]: (Xgv, Ygv, Zgv)=(Xo−R, Yo, Zo).
Nose directions [0], [9]: (Xgv, Ygv, Zgv)=(Xo, Yo, Zo).

By giving whether a compensation is performed on the inside of the target contour Ct or on the outside of the target contour Ct, the path Lc of the center Eo of the arc can be obtained mathematically by a known method (in an NC program, a G41 command or a G42 command is used to specify whether the right side or the left side of the blade in its progress direction is used). Then, after a nose direction has been given, the path Lvc of the imaginary tool tip Egv is obtained based on the relationship between (Xo, Yo, Zo) and (Xgv, Ygv, Zgv). After the path Lvc has been obtained, the movement path of the machine origin Om is obtained from the path Lvc by performing a tool length compensation in which the imaginary tool tip Egv is assumed as the tool tip Eg.

A concept of wear can also be applied in the nose R compensation. In this case, it is possible to: obtain a tool length offset (Xf; Yf; Zf) by adding a wear compensation parameter used in a tool length compensation to the tool length of an un-worn (new) tool Ta; and obtain a curvature radius R by subtracting the amount Rd of wear from a curvature radius Ro, which is a curvature radius in a case where the tool is not worn.

Tool Offset Window

Figure 17:
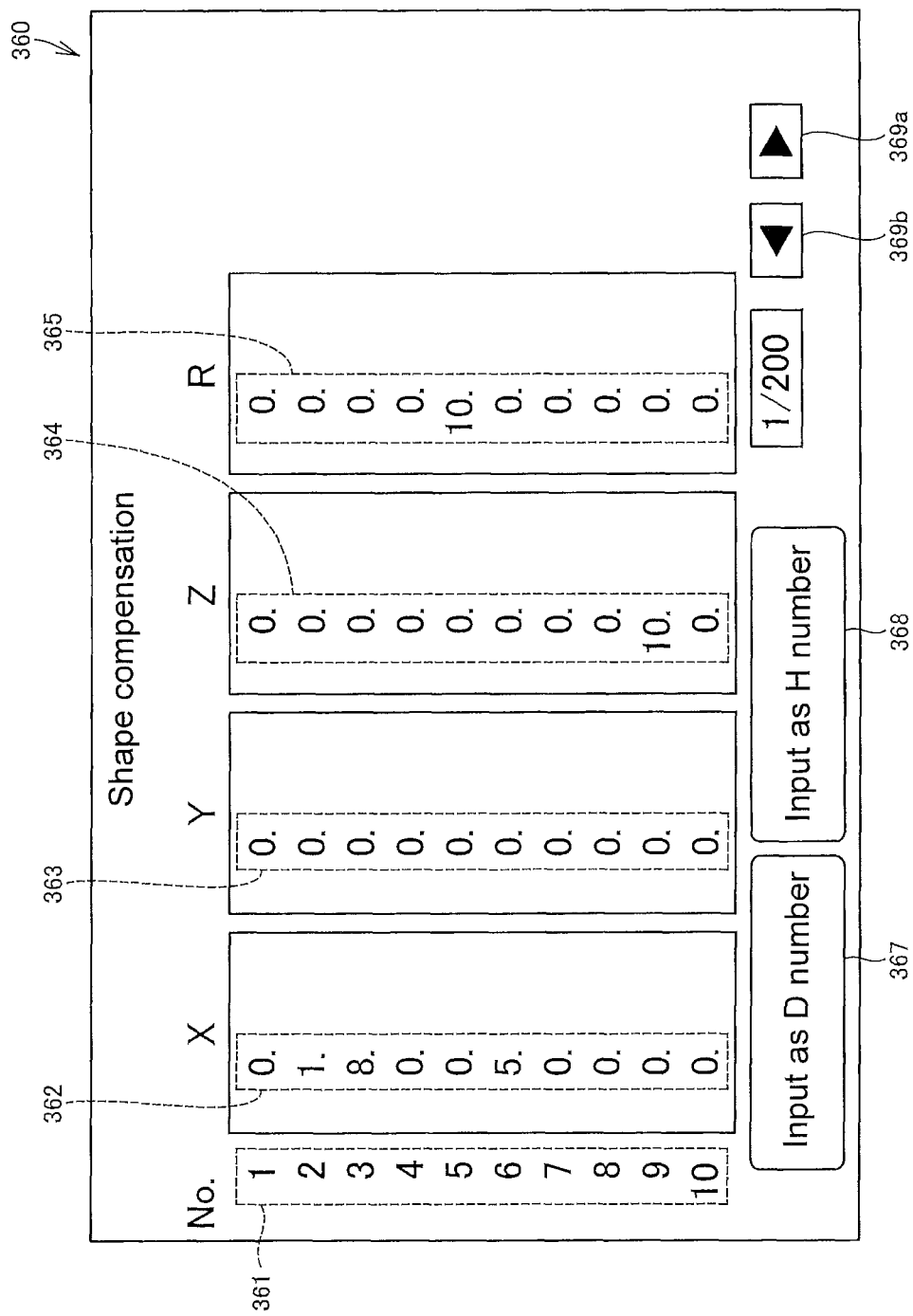
FIG. 17 illustrates an example of a tool offset window.
Figure 18:
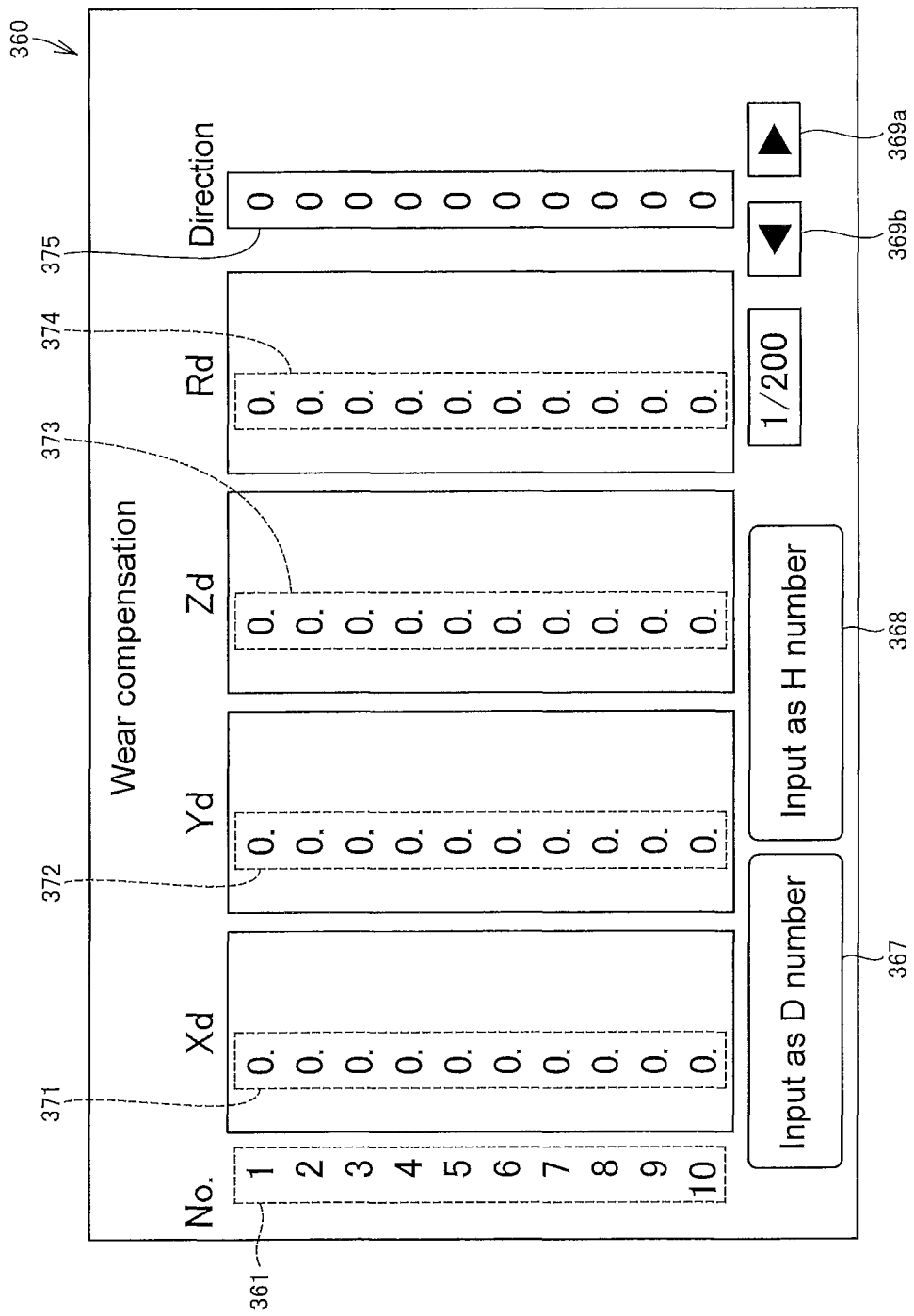
FIG. 18 illustrates another example of the tool offset window.

FIGS. 17 and 18 illustrate examples in which the tool offset window 360 is displayed. Referring to FIGS. 17 and 18, reference numbers 361 are displayed in a left end portion of the tool offset window 360. Each reference number 361 is referred to as: an H number, which is for referring to an offset value at G43 command/G44 command (tool length compensation); or a D number, which is for referring to an offset value at G41 command/G42 command (tool radius compensation). The reference number 361 is not directly associated with a tool Ta. FIGS. 17 and 18 are switched to and from each other by a switch button, not illustrated.

In FIG. 17, X values 362 are displayed on the right side of the reference numbers 361. Each X value 362 indicates: the Xm coordinate of the tool tip Eg used in a tool length compensation such that an un-worn (new) tool Ta is mounted on the tool spindle 114; or the Xm coordinate of the imaginary tool tip Egv used in a nose R compensation such that an un-worn (new) tool Ta is mounted on the tool spindle 114. On the right side of the X values 362, Y values 363 are displayed. Each Y value 363 indicates the Ym coordinate of the tool tip Eg used in a tool length compensation such that an un-worn (new) tool Ta is mounted on the tool spindle 114; or the Ym coordinate of the imaginary tool tip Egv used in a cutting edge roundness compensation such that an un-worn (new) tool Ta is mounted on the tool spindle 114. On the right side of the Y values 363, Z values 364 are displayed. Each Z value 364 indicates: the Zm coordinate of the tool tip Eg used in a tool length compensation such that an un-worn (new) tool Ta is mounted on the tool spindle 114; or the Zm coordinate of the imaginary tool tip Egv used in a nose R compensation such that an un-worn (new) tool Ta is mounted on the tool spindle 114. In a right end portion of the tool offset window 360, R values 365 are displayed. Each R value 365 indicates: a tool radius Rs used in a tool radius compensation; or the curvature radius Ro of the arc that is used in a nose R compensation and that defines the shape of the cutting edge Eg in a case where the tool is not worn.

In a lower right corner portion of the tool offset window 360, arrow buttons 369a and 369b are displayed. By tapping or clicking on the arrow buttons 369a and 369b, the range of reference numbers 361 displayed in the tool offset window 360 can be changed.

In FIG. 18, Xd values 371 are displayed on the right side of the reference number 361. Each Xd value 371 indicates the Xm coordinate of a wear compensation parameter used in a tool length compensation or a nose R compensation. On the right side of the Xd values 371, Yd values 372 are displayed. Each Yd value 372 indicates the Ym coordinate of a wear compensation parameter used in a tool length compensation or a nose R compensation. On the right side of the Yd values 372, Zd values 373 are displayed. Each Zd value 373 indicates the Zm coordinate of a wear compensation parameter used in a tool length compensation or a nose R compensation. On the right side of the Zd values 373, Rd values 374 are displayed. Each Rd value 374 indicates the amount Rd of radial wear used in a tool radius compensation or a nose R compensation. In the right end portion of the tool offset window 360, direction values 375, which correspond to the nose directions [0] to [9], are displayed. In a tool radius compensation, the direction values 375 are displayed as 0.

The reference number 361, the X value 362, the Y value 363, the Z value 364, the R value 365, the Xd value 371, the Yd value 372, the Zd value 373, the Rd value 374, and the direction value 375 are associated with each other on a single-row basis and are associated with at least one of the H number and the D number in the program code 302. Thus, tool information 158 associated with at least one of the H number and the D number in the program code 302 will be referred to as second tool information. The tool information includes the second tool information, and the second tool information includes at least one of the reference number 361, the X value 362, the Y value 363, the Z value 364, the R value 365, the Xd value 371, the Yd value 372, the Zd value 373, the Rd value 374, and the direction value 375. One reference number 361 is used to manage an offset value in one of a tool length compensation, a tool radius compensation, and a nose R compensation. That is, the second tool information is any one of a parameter for a tool length compensation, a parameter for a tool radius compensation, and a parameter for a nose R compensation. By employing such managing method, the R value 365, the Rd value 374, and the direction value 375 that belong to the same row as the reference number 361 corresponding to the tool length compensation are displayed as 0. The X value 362, the Y value 363, the Z value 364, the Xd value 371, the Yd value 372, and the Zd value 373 that belong to the same row as the reference number 361 corresponding to the tool radius compensation are displayed as 0.

In a lower end portion of the tool offset window 360, a D number input button 367 and an H number input button 368 are displayed. When a tool length compensation is performed, (1) the G43 command or the G44 command is input into the program code 302 beforehand using the G-code list window 320, the keyboard (which is one input interface 250), and/or related devices. Then, in the program editing window 300, an insertion position at which an H number is to be inserted is specified by a manipulation such as tapping, clicking, and cursor movement. (2) By referring to the tool offset window 360, a row in which an X value 362, a Y value 363, a Z value 364, an Xd value 371, a Yd value 372, and a Zd value 373 that are suitable for the tool length compensation are displayed is selected by tapping or clicking. (3) The H number input button 368 is tapped or clicked on. According to this procedure, an H number, which has the character H at the head, is inserted to the reference number 361 in the row selected in (2) at the insertion position in the program code 302 specified in (1). For example, when the reference number 361 that is selected is "3", H03 or H003 is input into the program code 302. Once the G43 command/the G44 command have referred to the reference number 361 thus input, the G43 command/the G44 command are valid until a G49 command is called and the tool length compensation is canceled, or until the offset value is changed by additional G43 command/G44 command.

When a tool radius compensation is performed, (1) the G41 command or the G42 command is input into the program code 302 beforehand using the G-code list window 320, the keyboard (which is one input interface 250), and/or related devices. Then, in the program editing window 300, an insertion position at which a D number is to be inserted is specified by a manipulation such as tapping, clicking, and cursor movement. (2) By referring to the tool offset window 360, a row in which an R value 365, an Rd value 374, and a direction value 375 that are suitable for the tool radius compensation are displayed is selected by tapping or clicking. It is to be noted that since the G41 command or the G42 command is used in both the tool radius compensation and the nose R compensation, the direction values 375 are referred to. It is necessary, therefore, to select a row in which the direction value 375 is 0 or 9 in the tool radius compensation. Generally, the direction value 375 is specified as 0. Lastly, (3) the D number input button 367 is tapped or clicked on. According to this procedure, a D number, which has the character D at the head, is inserted to the reference number 361 in the row selected in (2) at the insertion position in the program code 302 specified in (1). For example, when the reference number 361 that is selected is "5", D05 or D005 is input into the program code 302. Once the G41 command/the G42 command have referred to the reference number 361 thus input, the G41 command/the G42 command are valid until a G40 command is called and the tool radius compensation is canceled, or until the offset value is changed by additional G41 command/G42 command.

When a nose R compensation is performed, first, (1) a tool length offset associated with the imaginary tool tip Egv is compensated for by the above-described tool length compensation. The tool length compensation may be performed by the G43 command/the G44 command or may in some cases be performed by a T number. This will be described by referring to the tool data window modification 340a, described later. Next, (2) the G41 command or the G42 command is input into the program code 302 beforehand using the G-code list window 320, the keyboard (which is one input interface 250), and/or related devices. Then, in the program editing window 300, an insertion position at which a D number is to be inserted is specified by a manipulation such as tapping, clicking, and cursor movement. (3) By referring to the tool offset window 360, a row in which an R value 365, an Rd value 374, and a direction value 375 that are suitable for the nose R compensation are displayed is selected by tapping or clicking. In the nose R compensation, the position offset between the imaginary tool tip Egv and the center Eo of the arc is compensated for by the machine tool 100 referring to the direction values 375. In light of this, in the compensation at (1), the programmer may take into consideration the tool length offset associated with the imaginary tool tip Egv. Lastly, (4) the D number input button 367 is tapped or clicked on. According to this procedure, a D number, which has the character D at the head, is input to the reference number 361 in the row selected at (3) at the insertion position in the program code 302 specified at (2). For example, when the reference number 361 that is selected is "8", D08 or D008 is inserted into the program code 302. Once the G41 command/the G42 command have referred to the reference number 361 thus input, the G41 command/the G42 command are valid until a G40 command is called and the tool radius compensation is canceled, or until the offset value is changed by additional G41 command/G42 command.

Thus, the tool offset window 360 displays the reference numbers 361, the X values 362, the Y values 363, the Z values 364, the R values 365, the Xd values 371, the Yd values 372, the Zd values 373, the Rd values 374, and the direction values 375. Thus, the tool offset window 360 manages parameters associated with D number and H number in one assistance window, reducing the number of assistance windows 310. The tool offset window 360 also displays the D number input button 367 and the H number input button 368. By manipulating these buttons, the reference number 361 can be converted into a D number or an H number, which is then inserted into the program code 302. This enables the programmer to more easily input a selected parameter into the program code 302.

It is to be noted that the above-described displaying way in which the tool offset window 360 is displayed as illustrated in FIGS. 17 and 18 has been provided for exemplary purposes only; there are various other possible displaying ways. For example, the buttons and/or text may be displayed at positions other than the positions illustrated in FIGS. 17 and 18. For further example, the D number input button 367 and the H number input button 368 may not necessarily be represented by text but may be represented by a symbol or a pattern, and the arrow buttons 369a and 369b may be represented by any other symbol or may be represented by a pattern. It is to be noted that while in FIGS. 17 and 18 the parameters are displayed in numerical order of the reference number 361 in the tool offset window 360, the parameters may be displayed in order of past usage frequency or in order of usage frequency in a predetermined period of time in the past.

Macro Variables Window

Figure 19:
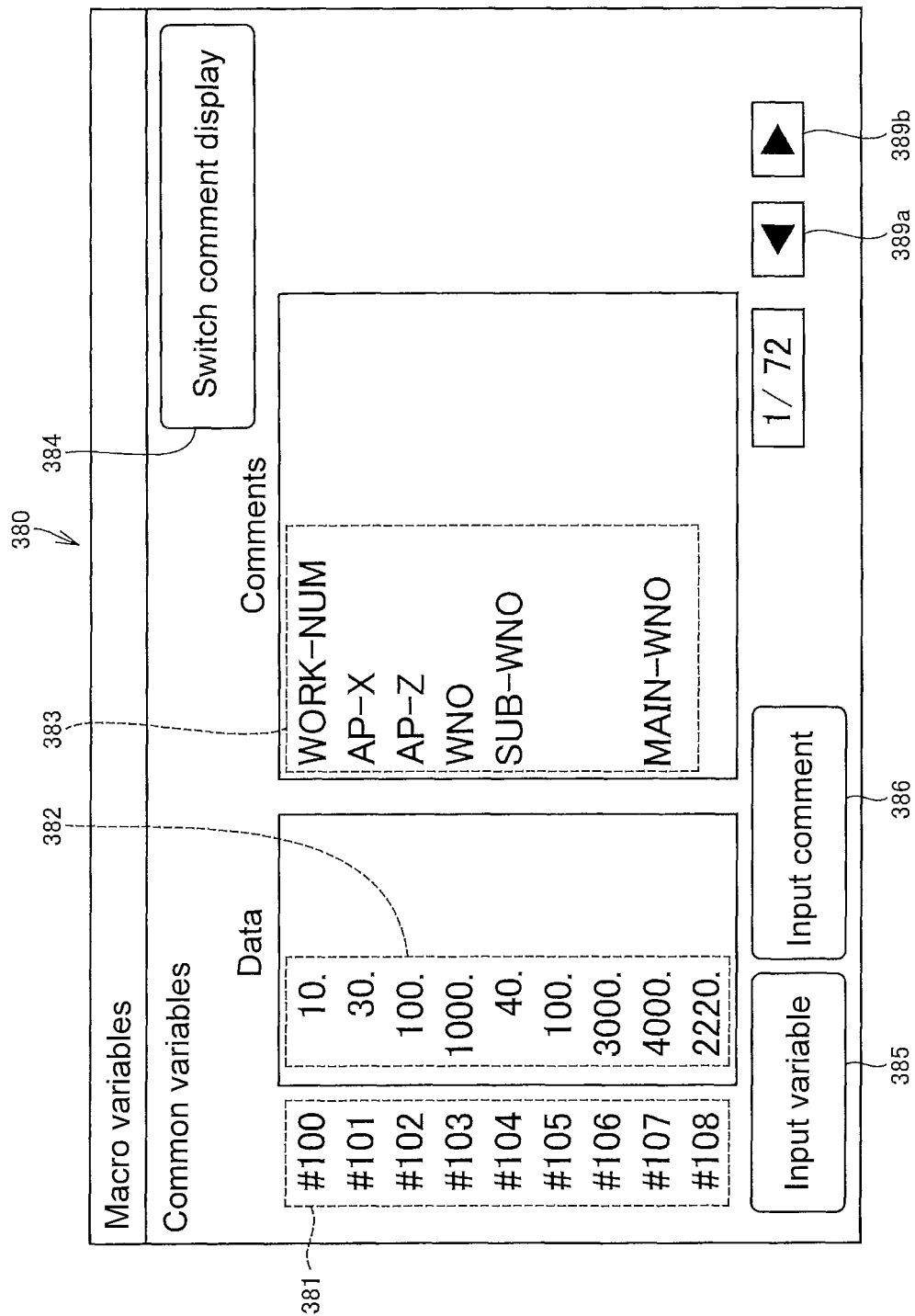
FIG. 19 illustrates an example of a macro variables window.

FIG. 19 illustrates an example in which the macro variables window 380 is displayed. The macro variables window 380 is a window in which numerical values of macro variables and contents of macro variables used in the machining program 157 are displayed. As used herein, the term "macro variable" is intended to mean a variable that is correlated to a numerical value repeatedly used in the program code. Using macro variables makes it easier to change numerical values repeatedly used in the program code. Macro variables can be classified into: common variables commonly usable in all the machining programs executed in the machine tool 100 (many such variables are in the hundreds and/or five-hundreds); local variables usable in one machining program (such variables are generally in #1 to #33); and system variables for managing system parameters of the machine tool 100 (such variables are generally in equal to or more than the thousands).

In FIG. 19, the macro variables window 380 displays numerical values and contents of common variables. While the macro variables window 380 may display local variables and system variables in a manner similar to the manner illustrated, examples in which local variables and system variables are displayed will not be elaborated upon here. In a left end portion of the macro variables window 380, variable names 381 are displayed. On the right side of the variable names 381, numerical values 382 are displayed. The numerical values 382 are values input into the macro variables indicated by the respective variable names 381.

In a right end portion of the macro variables window 380, comments 383 are displayed. The comments 383 correspond to the respective macro variables indicated by the respective variable names 381. The variable name 381, the numerical value 382, and the comment 383 are associated with each other on a single-row basis. In an upper right corner portion of the macro variables window 380, a comment display switch button 384 is displayed. By tapping or clicking on the comment display switch button 384, the comments 383 in the macro variables window 380 are switched between displayed state and non-displayed state. In a lower right corner portion of the macro variables window 380, arrow buttons 389a and 389b are displayed. By tapping or clicking on the arrow buttons 389a and 389b, the range of variable names 381 displayed in the macro variables window 380 can be changed.

At the left side of a lower end portion of the macro variables window 380, a variables input button 385 and a comment input button 386 are displayed. The variable name 381, the numerical value 382, and the comment 383 are managed on a single-row basis such that the variable name 381, the numerical value 382, and the comment 383 are associated with each other. This ensures that upon manipulation of one of the variable name 381, the numerical value 382, and the comment 383 by clicking or tapping, the variable name 381, the numerical value 382, and the comment 383 that belong to the same row of the item that has been manipulated by clicking or tapping are selected and processed such as being displayed in inverted black and white. Upon manipulation of the variables input button 385 by clicking or tapping with the above-described items in selected state, the macro variable associated with the selected variable name 381 is inserted into the program code 302 at the insertion position. Also, upon manipulation of the comment input button 386 by clicking or tapping with the above-described items in selected state, a character string obtained by adding a round bracket to both sides the selected comment 383 is inserted into the program code 302 at the insertion position. Specifically, in an example in which #100 is selected in FIG. 19, upon manipulation of the comment input button 386 by clicking or tapping, the character string (WORK-NUM) is inserted into the program code 302 at the insertion position.

Further, when a particular variable name 381, a particular numerical value 382, and/or a particular comment 383 have been manipulated by clicking or tapping, a pop-up window is displayed for editing the variable name 381, the numerical value 382, and the comment 383 that are selected. Using the pop-up window, the programmer is able to: edit the numerical value 382 and/or the comment 383; and set a macro variable that is not assigned a numerical value 382 yet.

It is to be noted that the above-described displaying way in which the macro variables window 380 is displayed as illustrated in FIG. 19 has been provided for exemplary purposes only; any other possible displaying way is possible insofar as the variable names 381 and the numerical values 382 are displayed. For example, the buttons and/or text may be displayed at positions other than the positions illustrated in FIG. 19. For further example, the comment display switch button 384, the variables input button 385, and the comment input button 386 may not necessarily be represented by text but may be represented by a symbol or a pattern, and the arrow buttons 389a and 389b may be represented by any other symbol or may be represented by a pattern. For further example, the comments 383, the comment display switch button 384, and the comment input button 386 may be omitted. For further example, while in FIG. 19 the variable names 381 are displayed in numerical order of macro variables in the macro variables window 380, the variable names 381 may be displayed in order of past usage frequency or in order of usage frequency in a predetermined period of time in the past.

Macro Input Window

Figure 20:
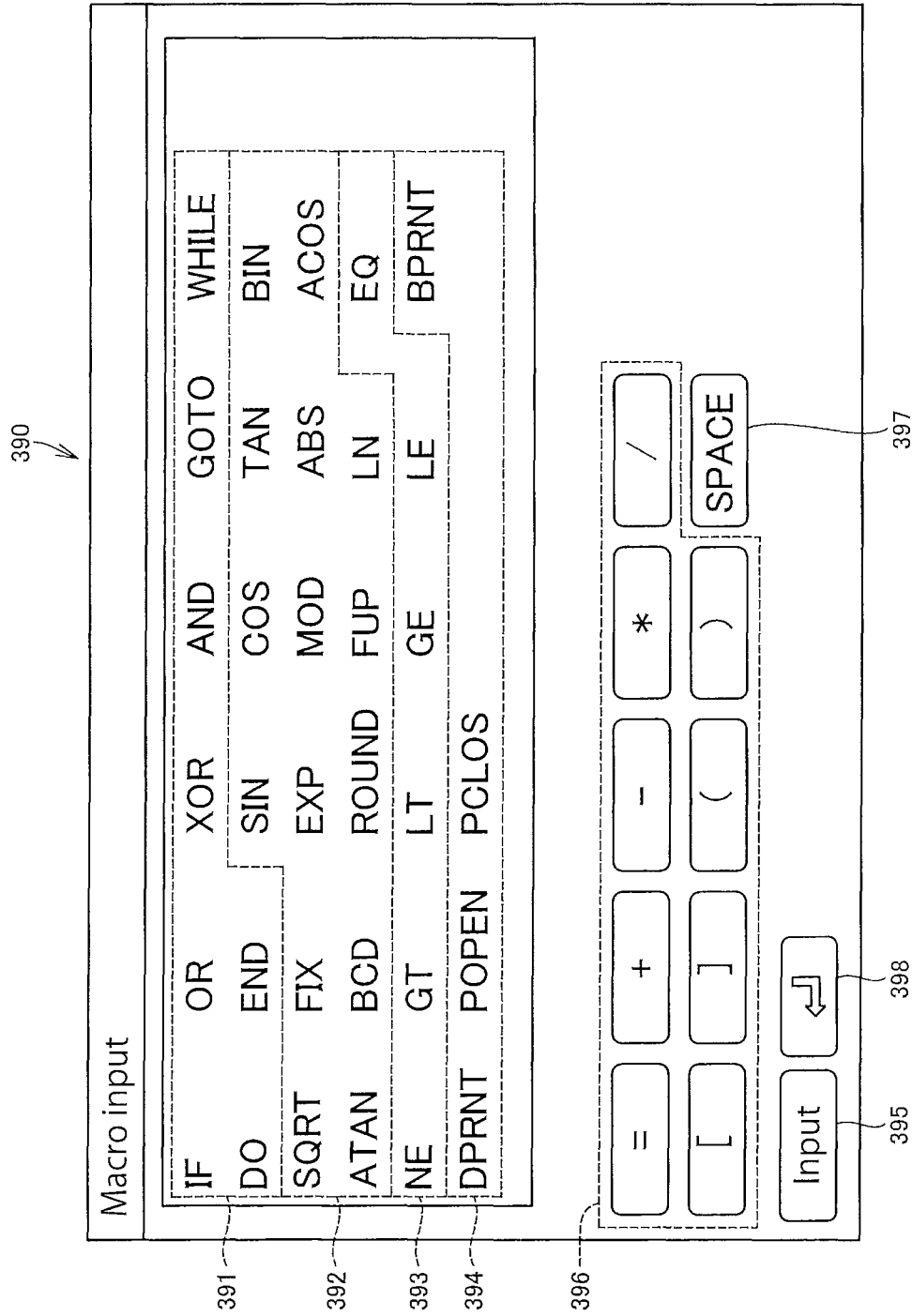
FIG. 20 illustrates an example of a macro input window.

FIG. 20 illustrates an example in which the macro input window 390 is displayed. The macro input window 390 is a window for inputting macros easily in the form of GUIs. In this embodiment, the term "macro" is intended to mean a character set used in programming. The character set is preferably a character set used generally or frequently. The macro includes: operators 391, each of which defines a control structure in the program code (the operator 391 will be hereinafter referred to as control command 391); function codes 392, each of which indicates a mathematical function; comparative operators 393; and external output commands 394.

Among the function codes 392, BCD is a function for converting binary data into BCD (Binary-Coded Decimal) data; BIN is a function for converting BCD data into binary data; FIX is a function for omitting decimals; FUP is a function for rounding up decimals; and ROUND is a function for outputting an integer obtained by a round-off. Among the comparative operators 393, EQ denotes "equal", NE denotes "not equal", GT denotes "greater than", LT denotes "less than", GE denotes "greater than or equal to", and LE denotes "less than or equal to". Among the external output commands 394, POPEN is a command of RS-232-C port open; POPEN is called before external data is output; PCLOS is a command of RS-232-C port close; PCLOS is called at the time of completion of external data output; DPRNT is a command for outputting an argument (character string and/or numerical value) in the form of an ISO code; and BPRNT is a command for outputting an argument (character string and/or numerical value) in binary form. Other function codes 392 than BCD, BIN, FIX, FUP, and ROUND and the control commands 391 will not be elaborated upon here because they are used in general program languages and therefore widely known.

In a lower end portion of the macro input window 390, an input button 395 is displayed. Upon manipulation of one of the control command 391, the function code 392, the comparative operator 393, and the external output command 394 by clicking or tapping, the code that has been manipulated by clicking or tapping is selected and processed such as being displayed in inverted black and white. Upon manipulation of the input button 395 by clicking or tapping with the code in selected state, the selected code is inserted into the program code 302 at the insertion position.

The macro input window 390 also displays: arithmetic operator key buttons 396, which are input buttons for symbols used in combination with the character sets 391 to 394; a space key button 397; and a line-feed key button 398. That is, the symbols include an arithmetic operator, an blank character, and a line-feed character. In an NC program, a line-feed character includes ";" (EOB). It is to be noted that the macro input window 390 may additionally display numeric key buttons of 0 to 9 and decimal key buttons, which are not displayed in FIG. 20. The macro input window 390 not only displays the above-described macros but also displays the input buttons 396 to 398, which are for symbols used in combination with the macros. In this context, the macro input window 390 may be referred to as programming assistance window.

Upon manipulation of an arithmetic operator key button 396 by clicking or tapping, the operator corresponding to the button that has been manipulated by clicking or tapping is inserted into the program code 302 at the insertion position. Upon manipulation of the space key button 397 by clicking or tapping, a space is inserted into the program code 302 at the insertion position. Upon manipulation of the line-feed key button 398 by clicking or tapping, a line-feed character (";" (EOB)) is inserted into the program code 302 at the insertion position. When inputs are made using the arithmetic operator key button 396, the space key button 397, and the line-feed key button 398, an input into the input button 395 is not necessary. It is to be noted that the machining-program editing program 221 may receive inputs other than inputs from the input buttons 396 to 398. Specifically, the machining-program editing program 221 may receive inputs of arithmetic operators, spaces, and line-feeds from a keyboard (which is one input interface 250) connected to the computer 200 or from a screen keyboard additionally displayed in the display window 30. It is also to be noted that the machining-program editing program 159 may receive inputs other than inputs from the input buttons 396 to 398. Specifically, the machining-program editing program 159 may receive inputs of arithmetic operators, spaces, and line-feeds from a screen keyboard additionally displayed in the display window 30.

The macro input window 390 is an assistance window (programming assistance window) that displays a character set including at least one of the function code 392, which specifies a mathematical function, the external output command 394, and the operators 391 and 393. The macro input window 390 also displays the input buttons 396 to 398, which are symbols used in combination with the character sets (macros) 391 to 394. This saves the labor of displaying an additional screen keyboard on, in particular, the touch panel-equipped display 154 of the machine tool 100 and making an input using the additional screen keyboard. As a result, programming in the machine tool 100 becomes more efficient.

The above-described macro variables are often input as an argument in the function code 392, as a comparison target value in the comparative operator 393, and/or as an argument in the external output command 394. In this case, the macro variables window 380 may be displayed in one of the first assistance window 312 and the second assistance window 314, and the macro input window 390 may be displayed in the other one of the first assistance window 312 and the second assistance window 314. This increases the efficiency with which the program is executed.

It is to be noted that the above-described displaying way in which the macro input window 390 is displayed as illustrated in FIG. 20 has been provided for exemplary purposes only; there are various other possible displaying ways. For example, the buttons and/or text may be displayed at positions other than the positions illustrated in FIG. 20. For further example, the input button 395 and the space key button 397 may not necessarily be represented by text but may be represented by a symbol or a pattern. For further example, the space key button 397 may be displayed in the form of a plain space bar button. For further example, the line-feed key button 398 may be represented by text or by any other symbol or a pattern. For further example, at least one of the arithmetic operator key button 396, the space button 397, and the line-feed key button 398 may be omitted. For further example, the control command 391, the function code 392, the comparative operator 393, and the external output command 394 may include codes other than the codes illustrated in FIG. 20, or some of the codes illustrated in FIG. 20 may be omitted.

Modification of Tool Data Window

A basic description of the display window 30 has been provided above. A possible extended function is that the parameters 361 to 365 and 371 to 375 managed in the tool offset window 360 are managed in the tool data window 340 in linkage with T numbers. In this case, when the tool is exchanged to a tool Ta corresponding to a T number, a tool length compensation is performed based on the parameters 361 to 365 and 371 to 375 managed in linkage with T numbers, irrespective of whether the G43 command and/or the G44 command are present or absent in the program code 302. By making an approximate setting in the machine tool 100, only a tool length compensation based on the G43 command and the G44 command can be validated; only a tool length compensation based on a T number can be validated; or a tool length compensation based on the G43 command, the G44 command, and a T number can be validated. When a tool length compensation based on the G43 command, the G44 command, and a T number is valid, a compensation value corresponding to the T number and a compensation value corresponding to the G43 command and the G44 command are added together, and a tool length compensation is performed using the resulting compensation value. It is to be noted that for tool radius compensation and nose R compensation it is necessary to display the G41 command or the G42 command in the program code irrespective of the display content of the tool data window 340.

Some tools Ta can be used in different kinds of machining using different blade edge faces. In such tool, the tool Ta edge faces have different parameters 361 to 365 and 371 to 375. By managing the edge faces, a tool Ta can be specified by the integer part of the T number 341 (or by predetermined first places of the T number 341), and a different edge face can be specified by the decimal places (or by the number after predetermined first places of the T number 341). A mark, symbol, or sign specifying such edge face will be referred to as suffix. While a single tool Ta may be specified by a combination of a T number 341 and a suffix, this configuration will not be elaborated upon here.

Figure 21:
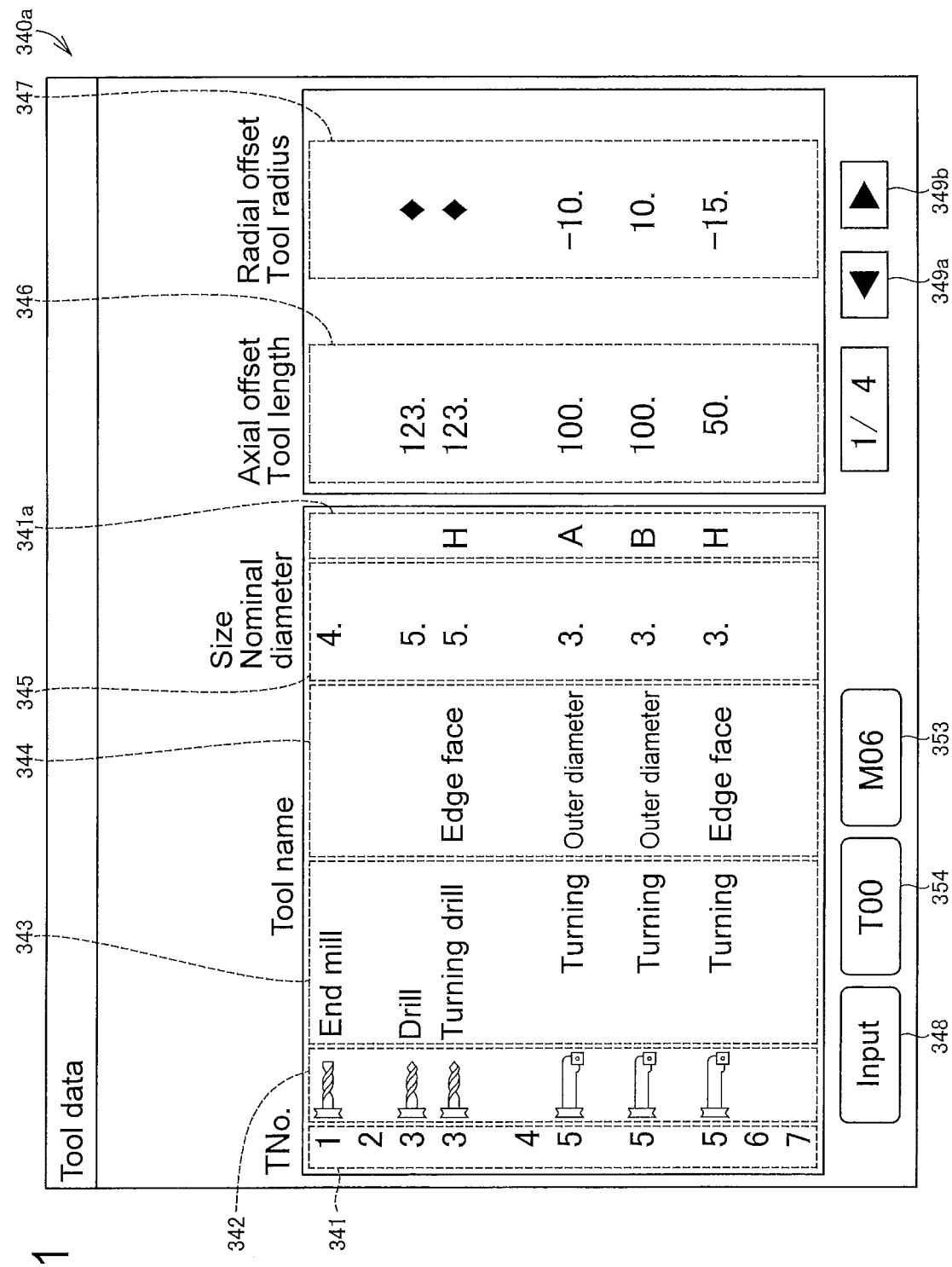
FIG. 21 illustrates a modification of the tool data window.

FIG. 21 illustrates the modification 340a of the tool data window 340. In FIG. 21, a drill used in a plurality of applications and having a T number of 3, and a turning tool having a T number of 5 are displayed. Each of these tools is assigned a suffix 341a, which is displayed on the right side of the numerical value 345. While the suffixes 341a are alphabets, whey they are input into the program code as T numbers, ABC . . . Z are converted into "01", "02", "03" . . . "26", or ABC . . . Z are converted into "61", "62", "63" . . . "86". For those tools without suffixes 341*a*, 00 is added as a suffix at the end of the T number input into the program code 302. In the following description, each of the tools illustrated in FIG. 21 will be referred to by using the corresponding T number output at the program code 302. For example, the turning drill will be referred to by using its T number, 3.08. It is to be noted that the suffixes 341*a* may not necessarily be alphabets but may be numerical characters. It is also to be noted that the suffixes 341*a* may be displayed at any other position (for example, between the T numbers 341 and the symbols 342).

In this modification, information referred to from a combination of a T number 341 and a suffix 341*a* includes a numerical value corresponding to at least one of the X value 362, the Y value 363, the Z value 364, the R value 365, the Xd value 371, the Yd value 372, the Zd value 373, the Rd value 374, and the direction value 375, which are managed in the tool offset window 360. Also in this modification, the numerical value 345 may be managed as a value corresponding to the R value 365 or the X value 362; the numerical value 346 may be managed as a value corresponding to the Z value 364; and the numerical value 347 may be managed as a value corresponding to the X value 362 or the R value 365.

The drill having a T number of 3.00 and the turning drill having a T number of 3.08 are identical as tools. The drill having a T number of 3.00, however, is used in drilling and necessitates a tool radius compensation to be performed in the machining. In contrast, the turning drill having a T number of 3.08 is used in turning and necessitates a tool length compensation (or a nose R compensation) to be performed in the machining. Thus, even though the tools are identical, they necessitate different compensations. In this case, the suffixes 341*a* are effective for parameter management purposes. In a tool length compensation, a tool radius compensation, and a nose R compensation where using a T number is effective, upon specification of T03.00 (T003.00) in the program code 302, a tool radius compensation in which a nominal diameter of, for example, 5.0 mm is taken into consideration is set. Upon specification of T03.08 (T003.08) in the program code 302, a tool length compensation in which the tool length offset is, for example, (5.0, 0.0, 123.0) is set. At the time when the machining program 157 is executed, the processor 151 of the machine tool 100 may determine whether any of the tool length compensation, the tool radius compensation, and the nose R compensation is approximate by referring to the machined-part names 344, the range of the suffixes 341*a*, and/or other parameters, instead of referring to the G41 command, the G42 command, the G43 command, and the G44 command.

Figure 22:
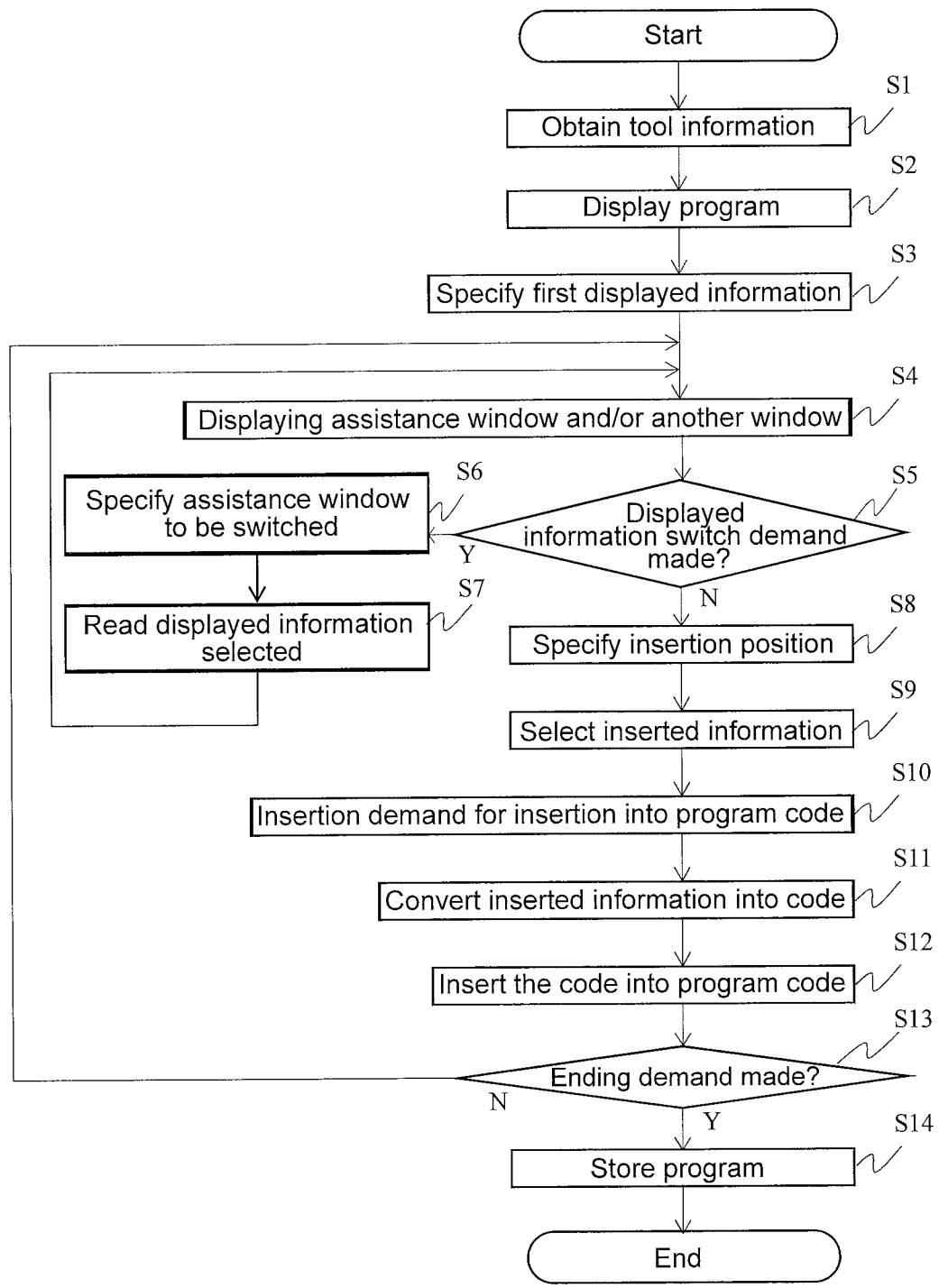
FIG. 22 is a flowchart of processing performed in a machining-program editing program.

By referring to the program editing window 300 and the tool data window 340, the programmer is able to input, into the program, T numbers corresponding to a tool length compensation, a tool radius compensation, and a nose R compensation that are suitable for machining, in the following manner. (1) In the program editing window 300, an insertion position at which a T number is to be inserted is specified by a manipulation such as tapping, clicking, and cursor movement. (2) By referring to the tool data window 340, a row in which a tool suitable for machining and a parameter for compensating for an error in machining are displayed is selected by tapping or clicking. (3) The input button 348 is tapped or clicked on. According to this procedure, a suffixed T number corresponding to the tool selected in (2) is input in the program code 302 at the insertion position specified in (1). Method for Editing Machining Program, and Flow of Processing of Machining-program Editing Program Next, turning according to this embodiment will be described. FIG. 22 is a flowchart of: a method for editing the machining program according to this embodiment; and processing of the machining-program editing program 221 (159). Upon execution of the machining-program editing program 221 (159), the processor 210 (151) performs the operations illustrated in FIG. 22. First, the processor 210 (151) obtains the tool information 158, which is specifying tools Ta mountable on the machine tool 100 (step S1). The tool information 158 includes at least one of, for example: T numbers, which correspond to the respective tools Ta; names (tool names) 343 of the tools Ta; dimensions 345 to 347 of the tools Ta; and parameters 362 to 365 and 371 to 375, which are for compensating for an error in machining. The parameters for compensating for an error in machining include at least one of: parameters 362 to 364 and 371 to 373 for a tool length compensation; parameters 365, 374, and 375 for a tool radius compensation; and parameters 365, 374, and 375 for a nose R compensation.

The tool information 158 preferably further includes the cumulative amounts of wear 351 and 352, which accumulate through use of the tools Ta. The tool information 158 may be read from the memory 220 (152) of the machine that executes the machining-program editing program 221 (159). Alternatively, the tool information 158 may be the latest tool information 158 obtained from the memory 152 of the machine tool 100. In particular, the cumulative amounts of wear 351 and 352 may be: calculated by the machine tool 100 (the processor 151) based on how the tool Ta is used and/or how long the tool Ta is used; stored in the memory 152; and read by the processor 210 through the network 290. This ensures that the cumulative amounts of wear 351 and 352 of tools Ta used in various kinds of machining programs 157 are managed in an integrated manner.

Next, the processor 210 (151) performs processing of displaying, on the display 240 (154), the program editing window 300, which displays the program code 302 of the machining program 157, which is for controlling the machine tool 100 (step S2). If the program code 302 is in an editing process, the processor 210 (151) reads, from the memory 220 (152), the program code in an editing process and displays the program code on the display 240 (154). Next, the processor 210 (151) specifies displayed information first to be displayed in the at least one assistance window 310 (the first assistance window 312 and the second assistance window 314) (step S3). The displayed information is selected from one of the tool data window 340, the tool offset window 360, the macro variables window 380, the macro input window 390, the G-code list window 320, and the M-code list window 330. At step S3, the window selected is preferably a display window selected in advance by default, a display window highly frequently used by the programmer, or a display window that, if the program code 302 is in an editing process, was displayed at the end of the previous editing.

Next, the processor 210 (151) performs processing of displaying the at least one assistance window 310 (step S4). More specifically, the processor 210 (151) performs processing of displaying, on the display 240 (154), the first assistance window 312 and the second assistance window 314 as the at least one assistance window 310. The processor 210 (151) performs processing of displaying, on the display 240 (154), the program editing window 300 and the at least one assistance window 310 such that the program editing window 300 and the at least one assistance window 310 are arranged side by side on the display 240 (154). At step S4, the processor 210 (151) performs processing of further displaying the displayed-information selection window 316 on the display 240 (154). The displayed-information selection window 316 is for selecting information (displayed information) to be displayed in the at least one assistance window 310, from the tool information, the control method, and other information that is other than the tool information and the control method. The other information includes at least one of: the macro variables specified in the program code 302 (the macro variables displayed in the macro variables window 380); and the character sets 391 to 394 (the character sets displayed in the macro input window 390), which are used in programming. Further, the processor 210 (151) performs processing of displaying the switch setting window 318 on the display 240 (154). The switch setting window 318 is for specifying one of the first assistance window 312 and the second assistance window 314.

Next, the processor 210 (151) determines whether there is a switch demand for switching the displayed information (step S5). The processor 210 (151) determines whether there is a switch demand by detecting an event in which the OK button 317 of the displayed-information selection window 316 has been manipulated. When there is a switch demand for switching the displayed information (Yes at step S5), the processor 210 (151) obtains information of an assistance window specified in the switch setting window 318. Then, based on the information, the processor 210 (151) specifies the assistance window for switching the displayed information (step S6). Then, the processor 210 (151) reads, from the memory 220 (152), the displayed information selected in the displayed-information selection window 316 (step S7). Then, back at step S4, the processor 210 (151) performs processing of displaying, in the at least one assistance window 310, the displayed information selected in the displayed-information selection window 316 (step S4). More specifically, the processor 210 (151) displays, in the assistance window selected in the switch setting window 318, the displayed information selected in the displayed-information selection window 316.

In this respect, at step S4, which is immediately after the macro variables window 380 and the macro input window 390 have been specified at step S3, the first assistance window 312 and the second assistance window 314 display neither the tool information, which is specifying the tools Ta, nor the control methods for controlling the tools Ta. Even though, however, the macro variables window 380 and the macro input window 390 have been specified at step S3, any one of the tool data window 340, the tool offset window 360, the G-code list window 320, and the M-code list window 330 is displayed at step S7. Thus, when step S4 is performed again, the at least one assistance window 310 displays at least one of the tool information, which is specifying the tools Ta, and the control methods for controlling the tools Ta. It is to be noted that when the control methods for controlling the tools Ta are displayed, this means that one of the G-code list window 320 and the M-code list window 330 is displayed.

Thus, at step S4, the processor 210 (151) is capable of performing processing of displaying, in the at least one assistance window 310 (the first assistance window 312 and the second assistance window 314), the tool data window 340, the tool offset window 360, the macro variables window 380, the macro input window 390, the G-code list window 320, and the M-code list window 330. In displaying these windows, the processor 210 (151) and the display 240 (154) perform the following characteristic operations.

(1) The processor 210 (151) performs processing of displaying, in one assistance window of the at least one assistance window 310, one of a G code and a customized code (M code) that is other than the G code. The display 240 (154) displays, in the one assistance window of the at least one assistance window 310, one of the G code and the customized code that is other than the G code.

(2) The processor 210 (151) performs processing of further displaying, in the one assistance window, the control content 322 or 332 of the one code. The display 240 (154) displays, in the one assistance window of the at least one assistance window 310, the control content of the one code selected from the G code and the customized code that is other than the G code.

(3) The processor 210 (151) performs processing of further displaying the key buttons 329 and 339 in the one assistance window. The key buttons 329 and 339 are for inputting EOB. The display 240 (154) displays the key buttons 329 and 339 in the one assistance window of the at least one assistance window 310. The key buttons 329 and 339 are for inputting EOB.

(4) The processor 210 (151) performs processing of displaying, in one assistance window of the at least one assistance window 310, one of: the first tool information (tool information 158 associated with the T numbers 341 in the program code 302: at least one of 341 to 347, 351, and 352); and the second tool information (tool information 158 associated with at least one of the H number and the D number in the program code 302: at least one of 361 to 365 and 371 to 375). The display 240 (154) displays one of the first tool information and the second tool information in the one assistance window of the at least one assistance window 310.

(5) The processor 210 (151) performs processing of further displaying the M06 command input button 353 in the assistance window (the tool data window 340) in which the first tool information is displayed. The M06 command input button 353 is for inputting the M06 command into the program code 302. The display 240 (154) further displays the M06 command input button 353 in the assistance window (the tool data window 340) in which the first tool information is displayed. The M06 command input button 353 is for inputting the M06 command into the program code 302.

(6) The processor 210 (151) performs processing of further displaying the T00 input button 354 in the assistance window (the tool data window 340) in which the first tool information is displayed. The T00 input button 354 is for inputting a T number that does not specify a tool Ta into the program code 302. The display 240 (154) further displays the T00 input button 354 in the assistance window (the tool data window 340) in which the first tool information is displayed. The T00 input button 354 is for inputting a T number that does not specify a tool Ta into the program code 302.

(7) The processor 210 (151) performs processing of further displaying, in the assistance window (the tool offset window 360) in which the second tool information is displayed: the reference number 361, which is associated with the second tool information; the H number input button 368, which is for inputting the reference number 361 as an H number into the program code 302; and the D number input button 367, which is for inputting the reference number 361 as a D number into the program code 302. The display 240 (154) further displays, in the assistance window (the tool offset window 360) in which the second tool information is displayed: the reference number 361, which is associated with the second tool information; the H number input button 368, which is for inputting the reference number 361 as an H number into the program code 302; and the D number input button 367, which is for inputting the reference number 361 as a D number into the program code 302.

(8) The processor 210 (151) performs processing of further displaying the input buttons 396 to 398 in the assistance window (the macro input window 390) in which the character sets 391 to 394 are displayed. The input buttons 396 to 398 are for inputting symbols used in combination with the character sets 391 to 394. The display 240 (154) further displays the input buttons 396 to 398 in the assistance window (the macro input window 390) in which the character sets 391 to 394 are displayed. The input buttons 396 to 398 are for inputting symbols used in combination with the character sets 391 to 394.

Next, when there is no switch demand for switching the displayed information (No at step S5), the processor 210 (151) specifies an insertion position at which a new code is to be inserted into the program code 302 (step S8). In the controller 150, the processor 151 may specify an insertion position by tapping on the touch panel of the touch panel-equipped display 154. In the computer 200, the processor 210 may specify an insertion position by clicking using the mouse of the input interface 250 or by moving the cursor using the keyboard of the input interface 250.

Next, in the at least one assistance window 310, at least one piece of inserted information (selected information) to be inserted into the program code 302 is selected (step S9). When the tool data window 340, the tool offset window 360, the G-code list window 320, and the M-code list window 330 are displayed in the at least one assistance window 310, at least one piece of information selected from the tool information and the control method is selected. For example, inserted information is selected in the following manner.

(1) In the G-code list window 320, a row of a G code 321 is selected by tapping or clicking.
(2) In the M-code list window 330, a row of a M code 331 is selected by tapping or clicking.
(3) In the tool data window 340, a tool (and a row in which a parameter for compensating for an error in machining is displayed) is selected by tapping or clicking.
(4) In the tool offset window 360, the row in which the parameter for compensating for an error in machining is displayed is selected by tapping or clicking.
(5) In the macro variables window 380, a row in which a variable name 381 is displayed is manipulated by clicking or tapping.
(6) In the macro input window 390, one of the control command 391, the function code 392, the comparative operator 393, and the external output command 394 is manipulated by clicking or tapping.

Next, the processor 210 (151) receives an insertion demand to insert the inserted information that has been selected into the program code 302 (step S10). As used herein, the term "insertion demand" is intended to mean an event in which the input button 328, 338, 348, 395, the D number input button 367, the H number input button 368, the variables input button 385, or the comment input button 386 has been manipulated (tapped or clicked on). The insertion demand may include an event in which the line-feed key button 329, 339, 398, the M06 command input button 353, the T00 input button 354, the arithmetic operator key button 396, or the space key button 397 has been manipulated (tapped or clicked on).

Upon receipt of the insertion demand, the processor 210 (151) converts the inserted information into a code (step S11). When the input buttons 328, 338, 348, and 395 and the variables input button 385 have been manipulated, the resulting program code includes: the selected G code 321; the selected M code 331; the selected T number of tool; one of the selected control command 391, the selected function code 392, the selected comparative operator 393, and the selected external output command 394; and the selected variable name 381. Upon manipulation of the D number input button 367, the processor 210 (151) converts the selected reference number 361 into a D number with letter D added to the head of the reference number 361. Upon manipulation of the H number input button 368, the processor 210 (151) converts the selected reference number 361 into an H number with letter H added to the head of the reference number 361. Upon manipulation of the comment input button 386, the processor 210 (151) converts the selected comment 383 into a character string with round brackets on both sides of the selected comment 383.

Next, the processor 210 (151) inserts the converted code into the program code 302 (step S12). Upon selection of at least one piece of information from the tool information and the control method in the at least one assistance window 310, the processor 210 (151) performs the operations from step S8 through step S12 to insert a command corresponding to the at least one piece of information into the program code 302 at the insertion position. For example, upon manipulation of the H number input button 368 with a reference number 361 specified in the assistance window (the tool offset window 360) in which the second tool information is displayed, the processor 210 (151) inserts an H number including the reference number into the program code 302 at the insertion position. Upon manipulation of the D number input button 367 with a reference number 361 specified in the assistance window (the tool offset window 360) in which the second tool information is displayed, the processor 210 (151) inserts a D number including the reference number 361 into the program code 302 at the insertion position. Upon manipulation of the comment input button 386 with a comment 383 specified in the macro variables window 380, the processor 210 (151) inserts a character string including the comment 383 into the program code 302 at the insertion position.

Next, the processor 210 (151) waits for a program ending demand (step S13). As used herein, the term "program ending demand" is intended to mean an ending event in which the machining-program editing program 221 (159) ends. When there is no program ending demand (No at step S13), the procedure returns to step S4. When there is a program ending demand (Yes at step S13), the processor 210 (151) stores the edited program code 302 in the memory 220 (152) (step S14), and the procedure ends.

Operations and Effects of this Embodiment

In the machine tool 100 according to this embodiment, in the method according to this embodiment for editing a machining program for the machine tool 100, and in the machining-program editing program 221 (159) according to this embodiment for editing the machining program for the machine tool, the tool information 158, which are specifying tools Ta mountable on the machine tool 100, are obtained. Then, the program editing window 300 and the at least one assistance window 310 are displayed such that the windows 300 and 310 are arranged side by side. The at least one assistance window 310 displays at least one of the tool information 158, which are specifying the tools Ta, and the control methods for controlling the tools Ta. Upon specification of an insertion position at which a new code is to be inserted into the program code 302 and upon selection of at least one piece of information from the tool information and the control method in the at least one assistance window 310, a command corresponding to the at least one piece of information is inserted into the program code 302 at the insertion position. This makes it easier to refer to and insert information necessary for editing the program code 302, the information including the tool information 158, which are specifying the tools Ta, and the control methods for controlling the tools Ta. As a result, programming of the machining program 157 becomes more efficient.

The order in which the steps in the flowchart illustrated in FIG. 22 are performed is changeable insofar as the same processing result is obtained. Also in FIG. 22, steps S13 and S14 may be omitted. In this case, after the processing at step S12, the procedure returns to step S4. When the at least one assistance window 310 includes only a single assistance window, step S6 may be omitted. Also in this embodiment, one or some of the tool data window 340, the tool offset window 360, the macro variables window 380, the macro input window 390, the G-code list window 320, and the M-code list window 330 may be omitted. It is to be noted, however, that at least one of the tool data window 340, the tool offset window 360, the G-code list window 320, and the M-code list window 330 is preferably not omitted.

The displayed-information selection window 316 and the switch setting window 318 may be omitted. In this case, among the tool data window 340, the tool offset window 360, the macro variables window 380, the macro input window 390, the G-code list window 320, and the M-code list window 330, those windows displayed in the at least one assistance window 310 are displayed without being switched to and from each other. In this case, steps S3 and S5 to S7 in FIG. 22 may be omitted.

According to a first embodiment of the present disclosure, a method for editing a machining program for a machine tool includes: obtaining tool information specifying a tool mountable on a machine tool; displaying a program editing window and at least one assistance window such that the program editing window and the at least one assistance window are arranged side by side, the program editing window showing a program code of the machining program for controlling the machine tool, the at least one assistance window showing at least one piece of information selected from the tool information specifying a tool and a control method for controlling the tool; specifying, in the program code, an insertion position at which a new code is to be inserted into the program code; and upon selection of the at least one piece of information from the tool information and the control method in the at least one assistance window, inserting a command into the program code at the insertion position, even when the tool information or the control method is displayed in the at least one assistance window, the command corresponding to the at least one piece of information.

According to a second embodiment of the present disclosure, the method according to the first embodiment for editing the machining program for the machine tool includes: displaying displayed-information selection window for selecting displayed information that is to be displayed in the at least one assistance window from among the tool information, the control method, and other information that is other than the tool information and the control method; and displaying, in the at least one assistance window, the displayed information selected in the displayed-information selection window.

According to a third embodiment of the present disclosure, the method according to the first embodiment or the second embodiment for editing the machining program for the machine tool includes: displaying a first assistance window and a second assistance window as the at least one assistance window; displaying a switch setting window for specifying one of the first assistance window and the second assistance window; and displaying, in the assistance window specified in the switch setting window, the displayed information selected in the displayed-information selection window.

According to a fourth embodiment of the present disclosure, in the method according to the second embodiment or the third embodiment for editing the machining program for the machine tool, the other information includes at least one of: a macro variable specified in the program code; and a character set used in programming.

According to a fifth embodiment of the present disclosure, in the method according to the fourth embodiment for editing the machining program for the machine tool, the character set includes at least one of: a function code specifying a mathematical function; an external output command; and an operator.

According to a sixth embodiment of the present disclosure, the method according to the fourth embodiment or the fifth embodiment for editing the machining program for the machine tool further includes displaying, in the assistance window in which the character set is displayed, an input button for inputting a symbol used in combination with the character set.

According to a seventh embodiment of the present disclosure, in the method according to any one of the first to sixth embodiments for editing the machining program for the machine tool, the control method includes a G code and a customized code that is other than the G code, and the method for editing the machining program for the machine tool further includes displaying one code of the G code and the customized code in one assistance window of the at least one assistance window.

According to an eighth embodiment of the present disclosure, the method according to the seventh embodiment for editing the machining program for the machine tool further includes displaying a control content of one of the codes in the one assistance window.

According to a ninth embodiment of the present disclosure, the method according to the seventh embodiment or the eighth embodiment for editing the machining program for the machine tool further includes displaying, in the one assistance window, a key button for inputting an EOB.

According to a tenth embodiment of the present disclosure, in the method according to any one of the first to ninth embodiments for editing the machining program for the machine tool, the tool information includes at least one of a T number corresponding to the tool, a name of the tool, a dimension of the tool, and a parameter for compensating for an error in machining.

According to an eleventh aspect of the present disclosure, in the method according to the tenth embodiment for editing the machining program for the machine tool, the tool information includes a cumulative amount of wear of the tool accumulating through use of the tool.

According to a twelfth embodiment of the present disclosure, in the method according to the tenth embodiment or the eleventh embodiment for editing the machining program for the machine tool, a parameter for compensating for an error in machining includes at least one of a parameter for a tool length compensation, a parameter for a tool radius compensation, and a parameter for a nose R compensation.

According to a thirteenth embodiment of the present disclosure, in the method according to any one of the first to twelfth embodiments for editing the machining program for the machine tool, the tool information includes: first tool information associated with a T number in the program code; and second tool information associated with at least one of an H number and a D number in the program code. The method for editing the machining program for the machine tool includes displaying one of the first tool information and the second tool information in one assistance window of the at least one assistance window.

According to a fourteenth embodiment of the present disclosure, in the method according to the thirteenth embodiment for editing the machining program for the machine tool, the first tool information includes a cumulative amount of wear of the tool accumulating through use of the tool.

According to a fifteenth embodiment of the present disclosure, the method according to the thirteenth embodiment or the fourteenth embodiment for editing the machining program for the machine tool further includes displaying, in the assistance window in which the first tool information is displayed, an M06 command input button for inputting an M06 command into the program code.

According to a sixteenth embodiment of the present disclosure, the method according to any one of the thirteenth to fifteenth embodiments for editing the machining program for the machine tool further includes displaying, in the assistance window in which the first tool information is displayed, a T00 input button for inputting, into the program code, the T number such that the T number does not specify the tool.

According to a seventeenth embodiment of the present disclosure, in the method according to any one of the thirteenth to sixteenth embodiments for editing the machining program for the machine tool, the second tool information includes one of a parameter for a tool length compensation, a parameter for a tool radius compensation, and a parameter for a nose R compensation. The method for editing the machining program for the machine tool further includes displaying, in the assistance window in which the second tool information is displayed: a reference number associated with the second tool information; an H number input button for inputting, into the program code, the reference number as an H number; and a D number input button for inputting, into the program code, the reference number as a D number. Upon manipulation of the H number input button with the reference number specified in the assistance window in which the second tool information is displayed, the method includes inserting the H number including the reference number into the program code at the insertion position. Upon manipulation of the D number input button with the reference number specified in the assistance window in which the second tool information is displayed, the method includes inserting the D number including the reference number into the program code at the insertion position.

According to an eighteenth embodiment of the present disclosure, in the method according to any one of the first to seventeenth embodiments for editing the machining program for the machine tool, the program editing window and the at least one assistance window are displayed in one display.

According to a nineteenth embodiment of the present disclosure, a machine tool includes: a memory storing tool information specifying a tool mountable on a machine tool; at least one display configured to display a program editing window and at least one assistance window such that the program editing window and the at least one assistance window are arranged side by side, the program editing window showing a program code of the machining program for controlling the machine tool, the at least one assistance window showing at least one piece of information selected from the tool information specifying a tool and a control method for controlling the tool; an interface for specifying, in the program code, an insertion position at which a new code is to be inserted into the program code; and a processor configured to, upon selection of the at least one piece of information from the tool information and the control method in the at least one assistance window, insert a command into the program code at the insertion position, even when the tool information or the control method is displayed in the at least one assistance window, the command corresponding to the at least one piece of information.

According to a twentieth embodiment of the present disclosure, in the machine tool according to the nineteenth embodiment, the display is configured to display: displayed-information selection window for selecting displayed information that is to be displayed in the at least one assistance window from among the tool information, the control method, and other information that is other than the tool information and the control method; and, in the at least one assistance window, the displayed information selected in the displayed-information selection window.

According to a twenty-first embodiment of the present disclosure, in the machine tool according to the nineteenth embodiment or the twentieth embodiment, the display is configured to display: a first assistance window and a second assistance window as the at least one assistance window; a switch setting window for specifying one of the first assistance window and the second assistance window; and, in the assistance window specified in the switch setting window, the displayed information selected in the displayed-information selection window.

According to a twenty-second embodiment of the present disclosure, in the machine tool according to the twentieth embodiment or the twenty-first embodiment, the other information includes at least one of: a macro variable specified in the program code; and a character set used in programming.

According to a twenty-third embodiment of the present disclosure, in the machine tool according to the twenty-second embodiment, the character set includes at least one of: a function code specifying a mathematical function; an external output command; and an operator.

According to a twenty-fourth embodiment of the present disclosure, in the machine tool according to the twenty-second embodiment or the twenty-third embodiment, the display is configured to further display, in the assistance window in which the character set is displayed, an input button for inputting a symbol used in combination with the character set.

According to a twenty-fifth embodiment of the present disclosure, in the machine tool according to any one of the nineteenth to twenty-fourth embodiments, the control method includes a G code and a customized code that is other than the G code, and the display of the machine tool is configured to display one code of the G code and the customized code in one assistance window of the at least one assistance window.

According to a twenty-sixth embodiment of the present disclosure, in the machine tool according to the twenty-fifth embodiment, the display is configured to further display a control content of one of the codes in the one assistance window.

According to a twenty-seventh embodiment of the present disclosure, the machine tool according to the twenty-fifth embodiment or the twenty-sixth embodiment, the display is configured to further display, in the one assistance window, a key button for inputting an EOB.

According to a twenty-eighth embodiment of the present disclosure, in the machine tool according to any one of the nineteenth to the twenty-seventh embodiment, the tool information includes at least one of a T number corresponding to the tool, a name of the tool, a dimension of the tool, and a parameter for compensating for an error in machining.

According to a twenty-ninth embodiment of the present disclosure, in the machine tool according to the twenty-eighth embodiment, the tool information includes a cumulative amount of wear of the tool accumulating through use of the tool.

According to a thirtieth embodiment of the present disclosure, in the machine tool according to the twenty-eighth embodiment or the twenty-ninth embodiment, a parameter for compensating for an error in machining includes at least one of a parameter for a tool length compensation, a parameter for a tool radius compensation, and a parameter for a nose R compensation.

According to a thirty-first embodiment of the present disclosure, in the machine tool according to any one of the nineteenth to thirtieth embodiments, the tool information includes: first tool information associated with a T number in the program code; and second tool information associated with at least one of an H number and a D number in the program code. The machine tool is configured to display one of the first tool information and the second tool information in one assistance window of the at least one assistance window.

According to a thirty-second embodiment of the present disclosure, in the machine tool according to the thirty-first embodiment, the first tool information includes a cumulative amount of wear of the tool accumulating through use of the tool.

According to a thirty-third embodiment of the present disclosure, in the machine tool according to the thirty-first embodiment or the thirty-second embodiment, the display is configured to display, in the assistance window in which the first tool information is displayed, an M06 command input button for inputting an M06 command into the program code.

According to a thirty-fourth embodiment of the present disclosure, in the machine tool according to any one of the thirty-first to the thirty-third embodiments, the display is configured to further display, in the assistance window in which the first tool information is displayed, a T00 input button for inputting, into the program code, the T number such that the T number does not specify the tool.

According to a thirty-fifth embodiment of the present disclosure, in the machine tool according to any one of the thirty-first to the thirty-fourth embodiments, the second tool information includes one of a parameter for a tool length compensation, a parameter for a tool radius compensation, and a parameter for a nose R compensation. In the machine tool, the display is configured to display, in the assistance window in which the second tool information is displayed: a reference number associated with the second tool information; an H number input button for inputting, into the program code, the reference number as an H number; and a D number input button for inputting, into the program code, the reference number as a D number. Upon manipulation of the H number input button with the reference number specified in the assistance window in which the second tool information is displayed, the processor is configured to insert the H number including the reference number into the program code at the insertion position. Upon manipulation of the D number input button with the reference number specified in the assistance window in which the second tool information is displayed, the processor is configured to insert the D number including the reference number into the program code at the insertion position.

According to a thirty-sixth embodiment of the present disclosure, in the machine tool according to any one of the nineteenth to the thirty-fifth embodiments, the program editing window and the at least one assistance window are displayed in the same display.

According to a thirty-seventh embodiment of the present disclosure, an editing program for editing a machining program for a machine tool includes executing processing including: obtaining tool information specifying a tool mountable on a machine tool; displaying a program editing window and at least one assistance window such that the program editing window and the at least one assistance window are arranged side by side, the program editing window showing a program code of the machining program for controlling the machine tool, the at least one assistance window showing at least one piece of information selected from the tool information specifying a tool and a control method for controlling the tool; specifying, in the program code, an insertion position at which a new code is to be inserted into the program code; and upon selection of the at least one piece of information from the tool information and the control method in the at least one assistance window, inserting a command into the program code at the insertion position, even when the tool information or the control method is displayed in the at least one assistance window, the command corresponding to the at least one piece of information.

According to a thirty-eighth embodiment of the present disclosure, the editing program according to the thirty-seventh embodiment for editing the machining program for the machine tool includes: displaying displayed-information selection window for selecting displayed information that is to be displayed in the at least one assistance window from among the tool information, the control method, and other information that is other than the tool information and the control method; and displaying, in the at least one assistance window, the displayed information selected in the displayed-information selection window.

According to a thirty-ninth embodiment of the present disclosure, the editing program according to the thirty-seventh embodiment or the thirty-eighth embodiment for editing the machining program for the machine tool includes: displaying a first assistance window and a second assistance window as the at least one assistance window; displaying a switch setting window for specifying one of the first assistance window and the second assistance window; and displaying, in the assistance window specified in the switch setting window, the displayed information selected in the displayed-information selection window.

According to a fortieth embodiment of the present disclosure, in the editing program according to the thirty-eighth embodiment or the thirty-ninth embodiment for editing the machining program for the machine tool, the other information includes at least one of: a macro variable specified in the program code; and a character set used in programming.

According to a forty-first embodiment of the present disclosure, in the editing program according to the fortieth embodiment for editing the machining program for the machine tool, the character set includes at least one of: a function code specifying a mathematical function; an external output command; and an operator.

According to a forty-second embodiment of the present disclosure, the editing program according to the fortieth embodiment or the forty-first embodiment for editing the machining program for the machine tool further includes displaying, in the assistance window in which the character set is displayed, an input button for inputting a symbol used in combination with the character set.

According to a forty-third embodiment of the present disclosure, in the editing program according to any one of the thirty-seventh to the forty-second embodiments for editing the machining program for the machine tool, the control method includes a G code and a customized code that is other than the G code, and the editing program further includes displaying one code of the G code and the customized code in one assistance window of the at least one assistance window.

According to a forty-fourth embodiment of the present disclosure, the editing program according to the forty-third embodiment for editing the machining program for the machine tool further includes displaying a control content of one of the codes in the one assistance window.

According to a forty-fifth embodiment of the present disclosure, the editing program according to the forty-third embodiment or the forty-fourth embodiment for editing the machining program for the machine tool further includes displaying, in the one assistance window, a key button for inputting an EOB.

According to a forty-sixth embodiment of the present disclosure, in the editing program according to any one of the thirty-seventh to the forty-fifth embodiments for editing the machining program for the machine tool, the tool information includes at least one of a T number corresponding to the tool, a name of the tool, a dimension of the tool, and a parameter for compensating for an error in machining.

According to a forty-seventh embodiment of the present disclosure, in the editing program according to the forty-sixth embodiment for editing the machining program for the machine tool, the tool information includes a cumulative amount of wear of the tool accumulating through use of the tool.

According to a forty-eighth embodiment of the present disclosure, in the editing program according to the forty-sixth embodiment or the forty-seventh embodiment for editing the machining program for the machine tool, a parameter for compensating for an error in machining includes at least one of a parameter for a tool length compensation, a parameter for a tool radius compensation, and a parameter for a nose R compensation.

According to a forty-ninth embodiment of the present disclosure, in the editing program according to any one of the thirty-seventh to the forty-eighth embodiments for editing the machining program for the machine tool, the tool information includes: first tool information associated with a T number in the program code; and second tool information associated with at least one of an H number and a D number in the program code. The editing program includes displaying one of the first tool information and the second tool information in one assistance window of the at least one assistance window.

According to a fiftieth embodiment of the present disclosure, in the editing program according to the forty-ninth embodiment for editing the machining program for the machine tool, the first tool information includes a cumulative amount of wear of the tool accumulating through use of the tool.

According to a fifty-first embodiment of the present disclosure, the editing program according to the forty-ninth embodiment or the fiftieth embodiment for editing the machining program for the machine tool includes displaying, in the assistance window in which the first tool information is displayed, an M06 command input button for inputting an M06 command into the program code.

According to a fifty-second embodiment of the present disclosure, the editing program according to any one of the forty-ninth to fifty-first embodiments for editing the machining program for the machine tool includes displaying, in the assistance window in which the first tool information is displayed, a T00 input button for inputting, into the program code, the T number such that the T number does not specify the tool.

According to a fifty-third embodiment of the present disclosure, in the editing program according to any one of the forty-ninth to the fifty-second embodiments for editing the machining program for the machine tool, the second tool information includes one of a parameter for a tool length compensation, a parameter for a tool radius compensation, and a parameter for a nose R compensation. The editing program further includes displaying, in the assistance window in which the second tool information is displayed: a reference number associated with the second tool information; an H number input button for inputting, into the program code, the reference number as an H number; and a D number input button for inputting, into the program code, the reference number as a D number. Upon manipulation of the H number input button with the reference number specified in the assistance window in which the second tool information is displayed, the editing program includes inserting the H number including the reference number into the program code at the insertion position. Upon manipulation of the D number input button with the reference number specified in the assistance window in which the second tool information is displayed, the editing program includes inserting the D number including the reference number into the program code at the insertion position.

According to a fifty-fourth embodiment of the present disclosure, in the editing program according to any one of the thirty-seventh to the fifty-third embodiments for editing the machining program for the machine tool, the program editing window and the at least one assistance window are displayed in one display.

The method according to the first embodiment for editing the machining program for the machine tool, the machine tool according to the nineteenth embodiment, and the editing program according to the thirty-seventh embodiment for editing the machining program for the machine tool make it easier to refer to and insert information necessary for editing a program code of a machining program, the information including tool information specifying a tool and a control method for controlling the tool. As a result, programming of the machining program becomes more efficient.

The second embodiment, the twentieth embodiment, and the thirty-eighth embodiment ensure that various pieces of information such as the tool information, the control method, and other information that is other than the tool information and the control method are displayed in at least one assistance window.

The third embodiment, the twenty-first embodiment, and the thirty-ninth embodiment ensure that various pieces of information such as the tool information, the control method, and other information that is other than the tool information and the control method are switchably displayed in at least one assistance window.

Regarding the fourth embodiment, the twenty-second embodiment, and the fortieth embodiment, macro variables and character sets used in programming are frequently used in programming. This makes programming of machining programs further more efficient.

Regarding the fifth embodiment, the twenty-third embodiment, and the forty-first embodiment, function codes, external output commands, and operators are, among character sets, particularly frequently used in machining programming for machine tools. This makes programming of machining programs further more efficient.

In the sixth embodiment, the twenty-fourth embodiment, and the forty-second embodiment, an input button for inputting a symbol used in combination with the character set is further displayed. This makes programming of machining programs further more efficient.

In the seventh embodiment, the twenty-fifth embodiment, and the forty-third embodiment, a G code, which is frequently used in programming of machining programs, and a customized code that is other than the G code are separately displayed in an assistance window. This makes programming of machining programs further more efficient.

The eighth embodiment, the twenty-sixth embodiment, and the forty-fourth embodiment enable a programmer to know a control content of the G code and the customized code without referring to a manual. This makes programming of machining programs further more efficient.

Regarding the ninth embodiment, the twenty-seventh embodiment, and the forty-fifth embodiment, a line-feed character (";" (EOB)) is in many cases placed before and/or after a G code and a customized code. By ensuring that EOB symbols can be input using the one assistance window, it is not necessary to display a separate screen keyboard for inputting EOB symbols on, in particular, a touch panel-equipped display of a machine tool. As a result, programming on, in particular, machine tools becomes more efficient.

Regarding the tenth embodiment, the twenty-eighth embodiment, and the forty-sixth embodiment, tool name, tool dimensions, and parameters for compensating for errors in cutting are information important for selecting a T number to be input into a program code. Thus, by including these pieces of information in the tool information, programming of machining programs becomes further more efficient.

The eleventh embodiment, the twenty-ninth embodiment, and the forty-seventh embodiment enable the programmer to, by checking the cumulative amount of wear, know whether the tool is being used approximately and/or the exchange time to exchange the tool. This makes it easier to select a tool suitable for a machining program.

Regarding the twelfth embodiment, the thirtieth embodiment, and the forty-eighth embodiment, the tool length compensation, the tool radius compensation, and the nose R compensation are methods frequently used for compensating for errors in machining. Using these methods makes programming of machining programs further more efficient.

Regarding the thirteenth embodiment, the thirty-first embodiment, and the forty-ninth embodiment, the first tool information and the second tool information may in some cases include a common parameter for compensating for an error in machining. If the first tool information and the second tool information are managed in the same assistance window, the programmer may mistake the parameter in one information as the parameter in the other information. In light of this situation, by managing the first tool information and the second tool information in separate assistance windows, the parameter is managed more easily.

Regarding the fourteenth embodiment, the thirty-second embodiment, and the fiftieth embodiment, the cumulative amount of wear is used when selecting a tool, that is, selecting a T number. By displaying the cumulative amount of wear in the assistance window as the first tool information, convenience for the programmer further improves.

Regarding the fifteenth embodiment, the thirty-third embodiment, and the fifty-first embodiment, an M06 command is highly associated with a T code. Therefore, programming convenience becomes higher if an M06 command can be input directly through the assistance window in which the first tool information is displayed. Under the circumstances, by displaying an M06 command input button in the assistance window in which the first tool information is displayed, programming of machining programs becomes further more efficient.

Regarding the sixteenth embodiment, the thirty-fourth embodiment, and the fifty-second embodiment, a T number that does not specify a tool is frequently used in combination with an M06 command. Under the circumstances, by displaying a T00 input button in the same window in which the M06 command input button is displayed, programming of machining programs becomes further more efficient.

In the seventeenth embodiment, the thirty-fifth embodiment, and the fifty-third embodiment, parameters associated with D number and H number are managed in one assistance window, reducing the number of assistance windows. Further, a D number input button and an H number input button are displayed in the assistance window in which the second tool information is displayed. By manipulating these buttons, a reference number can be converted into a D number or an H number and inserted into the program code. This enables the programmer to more easily input the selected parameter into the program code.

Regarding the eighteenth embodiment, the thirty-sixth embodiment, and the fifty-fourth embodiment, the program editing window and the at least one assistance window are closely associated with each other from a machining program editing standpoint, and preferably are not displayed in separate displays. By displaying the program editing window and the at least one assistance window in one display, programming of machining programs becomes further more efficient.

The technique disclosed in the present application makes it easier for a programmer to find a code necessary for editing a machining program for a machine tool.

In the present application, the term "comprise" and its variations are intended to mean open-ended terms, not excluding any other elements and/or components that are not recited herein. The same applies to the terms "include", "have", and their variations.

Also in the present application, a component suffixed with a term such as "member", "portion", "part", "element", "body", and "structure" is intended to mean that there is a single such component or a plurality of such components.

Also in the present application, ordinal terms such as "first" and "second" are merely used for distinguishing purposes and there is no other intention (such as to connote a particular order) in using ordinal terms. For example, the mere use of "first element" does not connote the existence of "second element"; otherwise, the mere use of "second element" does not connote the existence of "first element".

Also in the present application, approximating language such as "approximately", "about", and "substantially" may be applied to modify any quantitative representation that could permissibly vary without a significant change in the final result obtained. All of the quantitative representations recited in the present application shall be construed to be modified by approximating language such as "approximately", "about", and "substantially".

Also in the present application, the phrase "at least one of A and B" is intended to be interpreted as "only A", "only B", or "both A and B".

Obviously, numerous modifications and variations of the present invention are possible in light of the above teachings. It is therefore to be understood that within the scope of the appended claims, the present invention may be practiced otherwise than as specifically described herein.

What is claimed is:

1. A method for editing a machining program for a machine tool, the method comprising:
   obtaining tool information specifying at least one tool mountable on a machine tool including a controller having a processor;
   displaying a program editing window and at least one assistance window, the program editing window showing a program code of the machining program to control the machine tool, each of the at least one assistance window selectively showing the tool information and a control method, the tool being to be controlled according to the control method, the control method comprising an M06 command which is a tool exchange command, the tool information comprising T numbers each specifying which tool of the at least one tool or no tool is to be mounted on a tool spindle in the program code, the at least one assistance window including one assistance window in which an input button, a M06 command input button, and a table of the at least one tool are shown;
   specifying, in the program code, an insertion position at which a new code is to be inserted into the program code;
   selecting a selected tool from the table via an interface;
   converting, using the processor, the selected tool into a T code specifying a T number corresponding to the selected tool upon an input to the input button via the interface;
   inserting, using the processor, the T code into the program code at the insertion position upon the input to the input button; and
   inserting, using the processor, the M06 command into the program code at the insertion position upon an input to the M06 command input button via the interface.

2. The method according to claim 1, further comprising:
   selecting additional selected information from the control method when the control method is shown in the at least one assistance window; and
   inserting an additional command into the program code at the insertion position, the additional command corresponding to the additional selected information.

3. The method according to claim 1, further comprising:
   displaying displayed-information selection window in which items respectively corresponding to the tool information, the control method and other information than the tool information and the control method are shown in the displayed-information selection window, displayed information to be displayed in the at least one assistance window being to be selected from the tool information, the control method, and other information through the displayed-information selection window; and
   displaying, in the at least one assistance window, the displayed information selected in the displayed-information selection window.

4. The method according to claim 3, further comprising:
   displaying a first assistance window and a second assistance window as the at least one assistance window;
   displaying a switch setting window for specifying one of the first assistance window and the second assistance window; and
   displaying, in an assistance window specified in the switch setting window, the displayed information selected in the displayed-information selection window.

5. The method according to claim 3 wherein the other information comprises at least one of: a macro variable specified in the program code; and a character set used in programming.

6. The method according to claim 1,
   wherein the control method comprises a G code and a customized code that is other than the G code, and
   wherein one code of the G code and the customized code is shown in one assistance window of the at least one assistance window.

7. The method according to claim 6, further comprising displaying, in the at least one assistance window, a key button for inputting an End of Block (EOB).

8. The method according to claim 1, wherein the tool information comprises at least one of a T number specifying which tool or no tool is to be mounted on a tool spindle, the T number corresponding to the tool, a name of the tool, a dimension of the tool, and a parameter for compensating for an error in machining.

9. The method according to claim 1,
   wherein the tool information comprises
      second tool information associated with at least one of an H number for referring to an offset value for tool length compensation and a D number for referring to an offset value for tool radius compensation in the program code, and
   wherein the method further comprises displaying the second tool information in the one assistance window.

10. The method according to claim 9, wherein the first tool information comprises a cumulative amount of wear of the tool accumulating through use of the tool.

11. The method according to claim 1, further comprising:
    displaying, in the one assistance window, a T00 input button for inputting a T00 specifying that no tool is to be mounted on the tool spindle, at least one T number corresponding to the at least one tool being other than T00; and
    inserting, using the processor, a code indicating T00 into the program code at the insertion position upon an input to the T00 input button via the interface.

12. The method according to claim 9,
    wherein the second tool information comprises one of a parameter for a tool length compensation, a parameter for a tool radius compensation, and a parameter for a nose R compensation for compensating for moving path based on a shape of a cutting edge and a curvature radius, wherein the method further comprises displaying, in the one assistance window in which the second tool information is displayed:
  a reference number associated with the second tool information;
  an H number input button via which the reference number is input into the program code as the H number; and
  a D number input button via which the reference number is input into the program code as the D number,
wherein upon manipulation of the H number input button with the reference number specified in the one assistance window in which the second tool information is displayed, the H number including the reference number is inserted into the program code at the insertion position, and
wherein upon manipulation of the D number input button with the reference number specified in the one assistance window in which the second tool information is displayed, the D number including the reference number is inserted into the program code at the insertion position.

13. The method according to claim 1, wherein the program editing window and the at least one assistance window are shown in one display such that the program editing window and the at least one assistance window are arranged side by side.

14. The method according to claim 1,
wherein the interface is a touch-panel equipped display includes a touch panel, and
wherein the selecting of the selected information from the tool information via the interface includes clicking or tapping the tool information displayed on the touch panel when the tool information is shown in the at least one assistance window.

15. A machine tool comprising:
a memory to store tool information specifying at least one tool mountable on a machine tool;
at least one display configured to display a program editing window and at least one assistance window, the program editing window showing a program code of the machining program to control the machine tool, each of the at least one assistance window selectively showing the tool information and a control method, the tool being to be controlled according to the control method, the control method comprising an M06 command which is a tool exchange command, the tool information comprising T numbers each specifying which tool of the at least one tool or no tool is to be mounted on a tool spindle in the program code, the at least one assistance window including one assistance window in which an input button, a M06 command input button, and a table of the at least one tool are shown;
an interface via which selected information is selected from the tool information when the tool information is shown in the at least one assistance window and via which an insertion position at which a new code is to be inserted into the program code is input, the selected information including a selected tool selected from table via the interface; and
circuitry configured
  to convert the selected tool into a T code specifying a T number corresponding to the selected tool and to insert the T code into the program code at the insertion position upon an input to the input button via the interface, and
  to insert the M06 command into the program code at the insertion position upon an input to the M06 command input button via the interface.

16. The machine tool according to claim 15,
wherein the circuitry is configured to insert an additional command into the program code at the insertion position, the additional command corresponding to additional selected information that is selected from the control method when the control method is shown in the at least one assistance window.

17. The machine tool according to claim 15, wherein
the program editing window and the at least one assistance window are shown in one display such that the program editing window and the at least one assistance window are arranged side by side.

18. The machine tool according to claim 15,
wherein a T00 input button for inputting a T00 specifying that no tool is to be mounted on the tool spindle is displayed in the one assistance window,
wherein at least one T number corresponding to the at least one tool are other than T00, and
wherein the circuitry is configured to insert a code indicating T00 into the program code at the insertion position upon the input to the T00 input button via the interface.

19. A non-transitory computer-readable storage medium storing a machining program, the machining program causing a computer including a processor to execute processing comprising:
obtaining tool information specifying at least one tool mountable on a machine tool;
displaying a program editing window and at least one assistance window, the program editing window showing a program code of the machining program to control the machine tool, each of the at least one assistance window selectively showing the tool information and a control method, the tool being to be controlled according to the control method, the control method comprising an M06 command which is a tool exchange command, the tool information comprising T numbers each specifying which tool of the at least one tool or no tool is to be mounted on a tool spindle in the program code, the at least one assistance window including one assistance window in which an input button, a M06 command input button, and a table of the at least one tool are shown;
specifying, in the program code, an insertion position at which a new code is to be inserted into the program code;
obtaining a selected tool from the table via an interfaces;
converting, using the processor, the selected tool into a T code specifying a T number corresponding to the selected tool upon an input to the input button via the interface;
inserting, using the processor, the T code into the program code at the insertion position upon the input to the input button; and
inserting, using the processor, the M06 command into the program code at the insertion position upon an input to the M06 command input button via the interface.

20. The non-transitory computer-readable storage medium according to claim 19, wherein the processing further comprises:
- selecting additional selected information from the control method when the control method is shown in the at least one assistance window; and
- inserting an additional command into the program code at the insertion position, the additional command corresponding to the additional selected information.

21. The non-transitory computer-readable storage medium according to claim 19, wherein the program editing window and the at least one assistance window are shown in one display such that the program editing window and the at least one assistance window are arranged side by side.

* * * * *